(12) United States Patent
Ok et al.

(10) Patent No.: US 10,924,795 B2
(45) Date of Patent: *Feb. 16, 2021

(54) IMAGE DISPLAY DEVICE AND OPERATING METHOD THEREOF

(71) Applicant: SAMSUNG ELECTRONICS CO., LTD., Suwon-si (KR)

(72) Inventors: Dong-won Ok, Suwon-si (KR); Jae-oh Park, Suwon-si (KR); Han-soo Kim, Seoul (KR); Ji-eun Byun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

This patent is subject to a terminal disclaimer.

(21) Appl. No.: 16/295,598

(22) Filed: Mar. 7, 2019

(65) Prior Publication Data

US 2019/0208258 A1 Jul. 4, 2019

Related U.S. Application Data

(63) Continuation of application No. 15/455,578, filed on Mar. 10, 2017, now Pat. No. 10,257,562.

(Continued)

(30) Foreign Application Priority Data

Jul. 28, 2016 (KR) ........................ 10-2016-0096122

(51) Int. Cl.
*H04N 21/422* (2011.01)
*H04N 21/431* (2011.01)
(Continued)

(52) U.S. Cl.
CPC ... *H04N 21/42204* (2013.01); *G06F 3/04847* (2013.01); *G06F 3/04855* (2013.01);
(Continued)

(58) Field of Classification Search
CPC .......... H04N 21/4312; H04N 21/4383; H04N 21/42204; G06F 3/04847; G06F 3/04855; G06F 3/167

See application file for complete search history.

(56) References Cited

U.S. PATENT DOCUMENTS 6,057,831 A * 5/2000 Harms ............... H04N 21/4312 725/38
6,195,089 B1 2/2001 Chaney
(Continued)

FOREIGN PATENT DOCUMENTS

JP 2007-288717 A 11/2007
JP 5251147 B2 7/2013

*Primary Examiner* — Ricky Chin
(74) *Attorney, Agent, or Firm* — Sughrue Mion, PLLC

(57) ABSTRACT

An image display device includes: a processor; a memory configured to store channel information corresponding to at least one channel; and at least one program which is stored in the memory and executed by the processor. The program may include instructions for controlling a display so as to move a channel indicator in a first or second direction on a channel scroll bar and to display channel information of a channel corresponding to a point at which the channel indicator is located, in response to a first input of pressing a channel-up or channel-down key for a long time, and for switching a current channel to the channel corresponding to the point at which the channel indicator is located and displaying an image corresponding to the switched channel, in response to a second input of releasing the channel-up or channel-down key.

20 Claims, 17 Drawing Sheets

Related U.S. Application Data

(60) Provisional application No. 62/307,760, filed on Mar. 14, 2016.

(51) Int. Cl.

| | | |
|---|---|---|
| *H04N 21/438* | (2011.01) | |
| *G06F 3/0485* | (2013.01) | |
| *G06F 3/16* | (2006.01) | |
| *G06F 3/0484* | (2013.01) | |
| *H04N 21/41* | (2011.01) | |

(52) U.S. Cl.
CPC ......... *G06F 3/167* (2013.01); *H04N 21/4126* (2013.01); *H04N 21/42208* (2013.01); *H04N 21/42216* (2013.01); *H04N 21/42218* (2013.01); *H04N 21/42224* (2013.01); *H04N 21/42225* (2013.01); *H04N 21/42226* (2013.01); *H04N 21/42227* (2013.01); *H04N 21/42228* (2013.01); *H04N 21/4312* (2013.01); *H04N 21/4383* (2013.01); *H04N 21/4384* (2013.01)

(56) References Cited

U.S. PATENT DOCUMENTS

| | | | |
|---|---|---|---|
| 6,529,680 B1 | 3/2003 | Broberg | |
| 7,765,568 B1* | 7/2010 | Gagnon | H04N 21/4312 |
| | | | 725/38 |
| 8,073,955 B1* | 12/2011 | Gagnon | H04N 21/485 |
| | | | 709/227 |
| 2002/0113895 A1 | 8/2002 | Takagi | |
| 2003/0132971 A1 | 7/2003 | Billmaier | |
| 2005/0285979 A1 | 12/2005 | Tan | |
| 2006/0229557 A1 | 10/2006 | Fathallah | |
| 2007/0009229 A1 | 1/2007 | Liu | |
| 2008/0318635 A1 | 12/2008 | Yoon | |
| 2009/0077589 A1 | 3/2009 | Boyer | |
| 2010/0083315 A1 | 4/2010 | White | |
| 2010/0169945 A1 | 7/2010 | Kennedy et al. | |
| 2011/0271302 A1* | 11/2011 | Carlsgaard | H04N 21/482 |
| | | | 725/39 |
| 2015/0055022 A1 | 2/2015 | Friedman | |
| 2015/0128039 A1* | 5/2015 | Wieder | G06F 21/10 |
| | | | 715/716 |

\* cited by examiner

IMAGE DISPLAY DEVICE AND OPERATING METHOD THEREOF

CROSS-REFERENCE TO RELATED APPLICATIONS

This application is a Continuation Application of U.S. application Ser. No. 15/455,578, filed on Mar. 10, 2017, which claims the benefit of U.S. Provisional Application No. 62/307,760, filed on Mar. 14, 2016, in the United States Patent and Trademark Office, and priority from Korean Patent Application No. 10-2016-0096122, filed on Jul. 28, 2016, in the Korean Intellectual Property Office, the disclosures of which are incorporated herein by reference in their respective entireties.

BACKGROUND

1. Field

Exemplary embodiments relate to an image display device and an operating method thereof, and more particularly, to an image display device that is capable of easily switching a channel and an operating method thereof.

2. Description of the Related Art

Image display devices have a function of displaying images which can be viewed by a user. The user may view a broadcast program through an image display device. The image display device displays a broadcast program selected by the user from among broadcast signals broadcast by broadcast stations.

In addition, smart televisions (TVs) for providing various pieces of content in addition to the broadcast function have been provided. The smart TVs aim to analyze and satisfy a desire of a user without any operation of the user, instead of passively operating according to a selection by the user.

In general, to switch a channel of an image display device, a channel-up key or a channel-down key may be used, or a number of a channel to be switched may be input by using a numeric key. In addition, when pressing the channel-up key or the channel-down key for a long time for quick channel switching, the channel-up or channel-down key may operate for a predetermined time interval to switch a channel. In this case, if there are a number of channels stored in an image display device, it may take a relatively long time to switch to a desired channel.

SUMMARY

Provided are an image display device that is capable of quickly switching to a channel desired by a user by pressing a channel-up key or a channel-down key without a numeric key and an operating method thereof.

Additional aspects will be set forth in part in the description which follows and, in part, will be apparent from the description, or may be learned by practice of the presented exemplary embodiments.

According to an aspect of an exemplary embodiment, an image display device includes: a sensor configured to sense a first input of pressing a channel-up key or a channel-down key for at least a predetermined amount of time and a second input of releasing the channel-up key or the channel-down key; a display configured to display a channel scroll bar and a channel indicator; a processor; a memory configured to store channel information that corresponds to at least one channel; and at least one program which is stored in the memory and executed by the processor, wherein the at least one program may include instructions for controlling the display so as to move the channel indicator in a first direction or a second direction along the channel scroll bar and to display channel information that relates to a channel that corresponds to a point on the channel scroll bar at which the channel indicator is located, in response to the first input, and for switching a current channel to the channel that corresponds to the point on the channel scroll bar at which the channel indicator is located and displaying an image that corresponds to the switched channel, in response to the second input.

According to an aspect of another exemplary embodiment, an operating method of an image display device includes: displaying a channel scroll bar and a channel indicator; sensing a first input of pressing a channel-up key or a channel-down key for at least a predetermined amount of time; moving the channel indicator in a first direction or a second direction along the channel scroll bar and displaying channel information that relates to a channel that corresponds to a point on the channel scroll bar at which the channel indicator is located, in response to the sensed first input; sensing a second input of releasing the channel-up key or the channel-down key; and switching a current channel to the channel that corresponds to the point on the channel scroll bar at which the channel indicator is located and displaying an image that corresponds to the switched channel, in response to the sensed second input.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
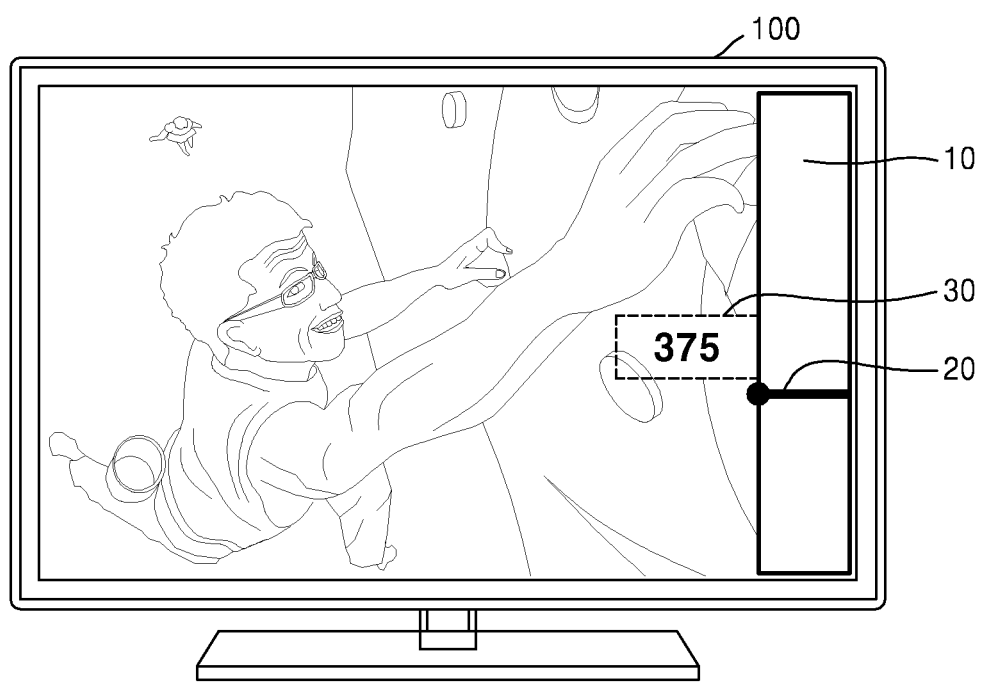
FIG. 1 illustrates an image display device and a control device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects thereof. As used herein, the term "and/or" includes any and all combinations of one or more of the associated listed items. Expressions such as "at least one of," when preceding a list of elements, modify the entire list of elements and do not modify the individual elements of the list.

The terms used in the specification will be schematically described, and then, the disclosed exemplary embodiments will be described in detail.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

Throughout the specification, it will also be understood that when a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

Hereinafter, exemplary embodiments will be described in detail with reference to the accompanying drawings so that those of ordinary skill in the art to which the present specification belongs may easily realize the exemplary embodiments. However, the present inventive concept may be embodied in many different forms and should not be construed as being limited to the exemplary embodiments set forth herein. In the drawings, parts irrelevant to the description are omitted to clearly describe the present inventive concept, and like reference numerals denote like elements throughout the specification.

FIG. 1 illustrates an image display device 100 and a control device 300, according to an exemplary embodiment.

As shown in FIG. 1, the image display device 100 may be a television (TV), but this is only illustrative, and the image display device 100 may be implemented by an electronic device that is capable of receiving a broadcast signal and displaying an image based on the broadcast signal. For example, the image display device 100 may be implemented by any of various electronic devices such as cellular phones, tablet personal computers (PCs), digital cameras, camcorders, laptop computers, desktop PCs, e-book terminals, digital broadcasting terminals, person digital assistants (PDAs), portable multimedia players (PMPs), navigation machines, MP3 players, and wearable devices. In particular, exemplary embodiments may be easily implemented in display devices having a large display, such as TVs but are not limited thereto.

Further, the image display device 100 may include a stationary or mobile digital broadcast receiver that is capable of receiving a digital broadcast signal. In addition, the image display device 100 may be implemented by any of a flat display device, a curved display device having a curved screen, or a flexible display device having an adjustable curvature. Examples of an output resolution of the image display device 100 may include high definition (HD), full HD, ultra HD, and a higher resolution than ultra HD.

The control device 300 may be implemented using any of various types of devices configured to control the image display device 100, such as a remote control, or a cellular phone. In addition, the control device 300 may control the image display device 100 by using a short-range communication scheme, such as, for example, an infrared or Bluetooth communication scheme. The control device 300 may control a function of the image display device 100 by using at least one of involved keys (including hard key buttons, soft keys, a scroll wheel, and the like), a touch pad, a microphone (not shown) that is capable of receiving a voice of a user, and a sensor that is capable of recognizing a motion of the control device 300.

The control device 300 may include a channel-up key and/or a channel-down key, each of which is operable to change a channel. The channel-up key and/or the channel-down key may be implemented by a hard key button, a soft key, a scroll wheel, or the like. When the image display device 100 receives a channel-up or channel-down key input, the image display device 100 may switch a current channel to a previous or subsequent channel.

The term "user" as used in exemplary embodiments of the present specification indicates a human being who controls a function or operation of the image display device 100 by using the control device 300 and may include a viewer, a manager, or an installation engineer.

According to an exemplary embodiment, the image display device 100 may display a channel scroll bar 10 and a channel indicator 20 on a display. Although FIG. 1 shows that the channel scroll bar 10 is displayed in the form of a vertical scroll bar on the right side of the display, the channel scroll bar 10 is not limited thereto and may be displayed in the form of a horizontal scroll bar on the left side, the top, the bottom, or the like of the display. In addition, the channel indicator 20 may be displayed on the channel scroll bar 10 and may indicate a location of a channel that corresponds to channel information 30 displayed on the display from among all channels. The image display device 100 may display, on the display, the channel information 30 that relates to a channel that corresponds to a point at which the channel indicator 20 is located on the channel scroll bar 10. The channel information 30 may include any of a channel name of a channel, a broadcasting station which provides the channel, a channel number, a type of content that corresponds to the channel, a content name of the content, and the like.

According to an exemplary embodiment, the image display device 100 may move the channel indicator 20 in a first or second direction on the channel scroll bar 10 in response to a long press input on the channel-up or channel-down key included in the control device 300. In this case, the long press input indicates an input of maintaining a key pressing state for a threshold time or longer (i.e., for at least a predetermined amount of time) after pressing a key. For example, the long press input indicates a case in which a time difference between a key pressing time point and a key releasing time point is the threshold time or longer.

For example, as shown in FIG. 1, when the channel scroll bar 10 is a vertical scroll bar, the image display device 100 may move the channel indicator 20 upwards in response to a long press input on the channel-up key, and may move the channel indicator 20 downwards in response to a long press input on the channel-down key. Alternatively, when the channel scroll bar 10 is a horizontal scroll bar, the image display device 100 may move the channel indicator 20 to the left or right in response to a long press input on the channel-up key or the channel-down key. However, the present exemplary embodiment is not limited thereto. In addition, the image display device 100 may display, on the display, the channel information 30 that relates to a channel that corresponds to a point on the channel scroll bar 10 to which the channel indicator 20 has been moved.

Figure 2:
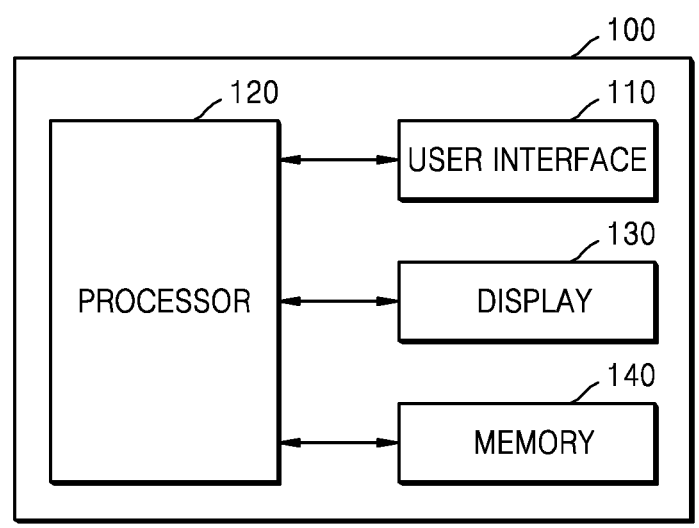
FIG. 2 is a block diagram of the image display device, according to an exemplary embodiment.

FIG. 2 is a block diagram of the image display device 100, according to an exemplary embodiment.

Referring to FIG. 2, the image display device 100 according to an exemplary embodiment may include a user interface 110, a processor 120, a display 130, and a memory 140.

According to an exemplary embodiment, the user interface 110 may receive a user input and transmit a received signal to the processor 120. The user interface 110 may include at least one of an IR receiver, a wireless receiver receiving a user command by wireless fidelity (Wi-Fi) or Bluetooth, and a key operator including at least one of key.

In addition, the user interface 110 may receive a user input, such as, for example, any of channel-up/down, power on/off, channel selection, or screen configuration from the control device 300. In addition, according to an exemplary embodiment, the user interface 110 may receive channel change command corresponding to a press input on a channel-up key or a channel-down key, a long press input on the channel-up key or the channel-down key, a release input on the channel-up key or the channel-down key, and the like.

The display 130 generates a driving signal by converting an image signal, a data signal, an on-screen display (OSD) signal, a control signal, or the like processed by the processor 120. The display 130 may be implemented by any of a plasma display panel (PDP), a liquid crystal display (LCD), an organic light-emitting diode (OLED) display, a flexible display, or the like or may also be implemented by a three-dimensional (3D) display. In addition, the display 130 may be configured by a touch screen so that the display 130 is used as an input device, in addition to being used as an output device.

According to an exemplary embodiment, the display 130 may display a channel scroll bar and a channel indicator. In addition, the display 130 may display channel information that relates to a channel that corresponds to a point at which the channel indicator is located on the channel scroll bar.

According to an exemplary embodiment, the processor 120 may execute at least one program stored in the memory 140. The processor 120 may include a single core, dual cores, triple cores, quad cores, or a multiple number of cores. In addition, the processor 120 may include a plurality of processors. For example, the processor 120 may be implemented by a main processor (not shown) and a sub-processor (not shown) operating in a sleep mode.

According to an exemplary embodiment, the memory 140 may store various data, programs, or applications for operating and controlling the image display device 100.

According to an exemplary embodiment, the memory 140 may store at least one channel and channel information that corresponds to the at least one channel. In this case, the at least one channel may include a valid channel. The valid channel may indicate a channel via which a broadcast signal that corresponds to a corresponding channel is receivable. In addition, the image display device 100 may periodically update the channel information stored in the memory 140.

In addition, the program stored in the memory 140 may include at least one instruction. The program (the at least one instruction) or application stored in the memory 140 may be executable by the processor 120.

According to an exemplary embodiment, the processor 120 may compare the number of channels stored in the memory 140 with a preset number in order to determine whether to display the channel scroll bar and the channel indicator.

According to an exemplary embodiment, the processor 120 may control the display 130 to display the channel scroll bar and the channel indicator, in response to the channel command being received continuously for a first predetermined amount of time via the user interface 110. The processor 120 may control to move the channel indicator in a first direction or a second direction along the channel scroll bar according to the channel change command which is received via the user interface 110 after the channel scroll bar is displayed. In response to the channel change command being not received via the user interface for a second predetermined amount of time, the processor 120 may control to switch a current channel to the channel that corresponds to the point on the channel scroll bar at which the channel indicator is located and display an image that corresponds to the switched channel.

The processor 120 may control to move quickly the channel indicator, in response to the channel change command being received continuously via the user interface 110, after the channel scroll bar is displayed. The processor 120 may control to switch the current channel to the channel that corresponds to the point on the channel scroll bar at which the channel indicator is located, in response to end of the channel change command being received continuously. The processor 120 may control to switch the current channel to the channel that corresponds to the point on the channel scroll bar at which the channel indicator is located, in response to receiving a signal corresponding to a release of the channel change command from the control device 300. The processor 120 may control to switch the current channel to the channel that corresponds to the point on the channel scroll bar at which the channel indicator is located, in response to the channel change command being not received for the second predetermined amount of time, after the channel change command is received lastly.

The processor 120 may control the channel indicator in response to a first input of pressing the channel-up key or the channel-down key for a long time, so that the channel indicator moves in the first direction or the second direction along the channel scroll bar. In addition, the processor 120 may control the display 130 so that channel information that relates to a channel that corresponds to a point on the channel scroll bar at which the channel indicator is located is displayed on the display 130.

The processor 120 may control the channel indicator so that the channel indicator moves in the first direction from a first point on the channel scroll bar to a second point which is adjacent to the first point, and control the display 130 so that the display 130 changes from channel information that relates to a first channel that corresponds to the first point to channel information that relates to a second channel next to the first channel and displays the channel information that relates to the second channel. Alternatively, the processor 120 may control the channel indicator so that the channel indicator moves in the second direction from the first point on the channel scroll bar to a third point which is adjacent to the first point and control the display 130 so that the display 130 changes from the channel information that relates to the first channel to channel information that relates to a third channel previous to the first channel and displays the channel information that relates to the third channel.

In addition, the processor 120 may control a current channel in response to a second input of releasing the channel-up key or the channel-down key, so that the current channel is switched to a channel that corresponds to a point on the channel scroll bar at which the channel indicator is located. For example, the processor 120 may receive a broadcast signal that corresponds to the switched channel and control the display 130 so that the display 130 displays an image generated based on the received broadcast signal.

According to an exemplary embodiment, the processor 120 may determine a channel that corresponds to a point at which the channel indicator is located, based on a relative location of the channel indicator on the channel scroll bar.

Figure 3:
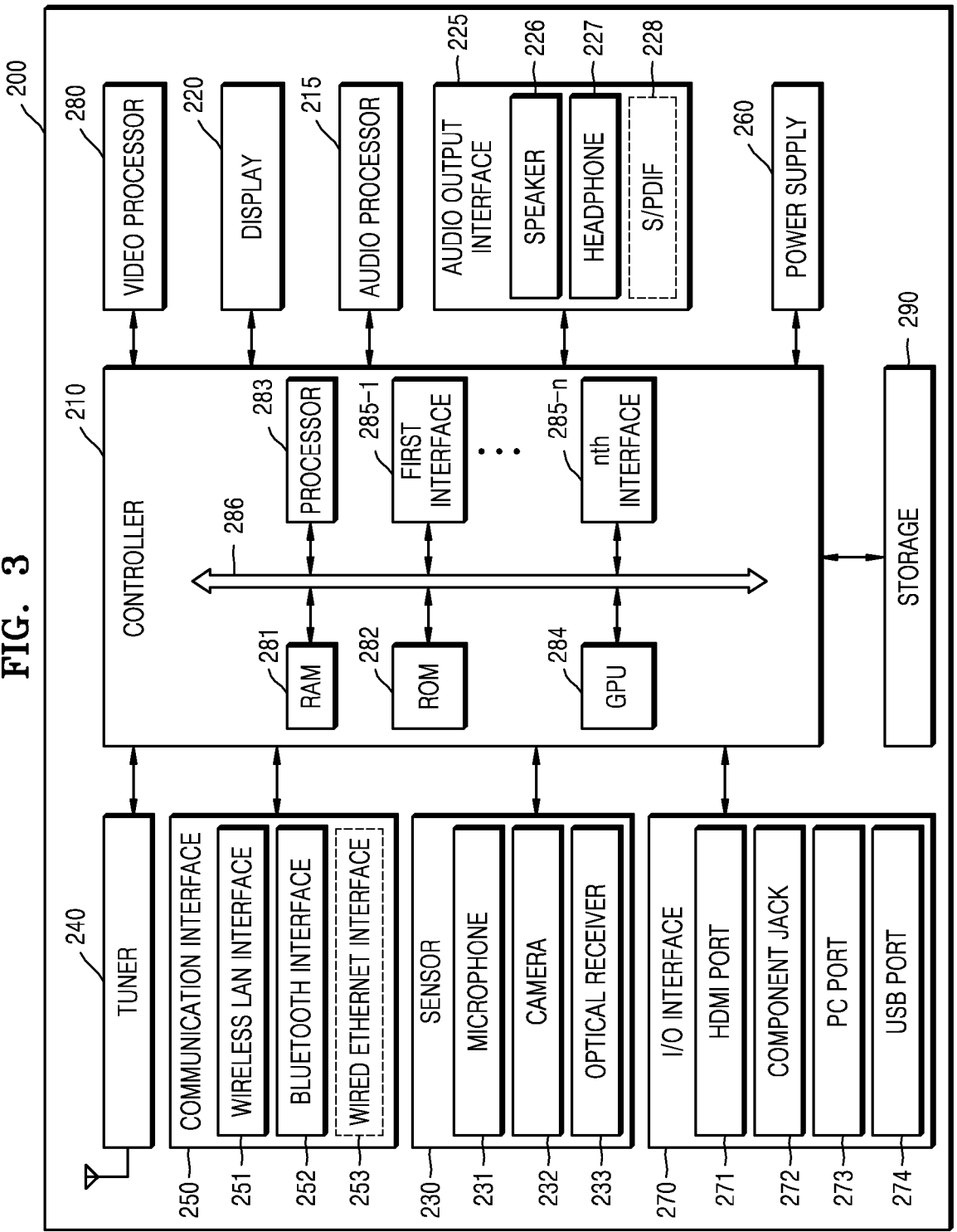
FIG. 3 is a block diagram of an image display device, according to another exemplary embodiment.

FIG. 3 is a block diagram of an image display device 200, according to another exemplary embodiment. The image display device 200 of FIG. 3 may be an embodiment of the image display device 100 of FIG. 1.

Referring to FIG. 3, the image display device 200 according to another exemplary embodiment may include a controller 210, a display 220, a sensor 230, a video processor 280, an audio processor 215, an audio output interface 225, a power supply 260, a tuner 240, a communication interface 250, an input/output (I/O) interface 270, and a storage 290.

The user interface 110, the processor 120, the memory 140, and the display 130 of FIG. 2 may correspond to the sensor 230, the controller 210, the storage 290, and the display 220 of FIG. 3, respectively. The same description as described with reference to FIG. 2 is omitted herein.

The communication interface 250 may transmit/receive data or a signal to/from an external device and/or a server under control of the controller 210. The controller 210 may transmit/receive content to/from an external device connected via the communication interface 250, download an application from the external device, and/or perform web browsing via the communication interface 250. The communication interface 250 may transmit/receive data or a signal by at least one scheme from among wireless local area network (WLAN) (e.g., wireless fidelity (Wi-Fi)), Bluetooth, and wired Ethernet communication schemes in correspondence with the performance and structure of the image display device 200. In addition, the communication interface 250 may include a combination of a WLAN interface 251, a Bluetooth interface 252, and a wired Ethernet interface 253. The communication interface 250 may further include other short-range communication interfaces (e.g., a near field communication (NFC) interface, not shown) and a Bluetooth low energy (BLE) communication interface (not shown) in addition to the Bluetooth interface 252.

The tuner 240 may process a broadcast signal received in a wired or wireless manner by performing amplification, mixing, resonance, and the like and tune and select only a frequency of a channel which the image display device 200 desires to receive from among a number of received frequency components. The broadcast signal includes audio, video and additional information (e.g., electronic program guide (EPG)).

The tuner 240 may receive a broadcast signal in a frequency band that corresponds to a channel number according to a user input (e.g., a control signal received from the control device 300, examples of the control signal include a channel number input, a channel up/down input, and a channel input on an EPG screen image).

The tuner 240 may receive broadcast signals from any of various sources, such as terrestrial broadcasting stations, cable broadcasting stations, satellite broadcasting stations, and Internet broadcasting stations. The tuner 240 may receive broadcast signals from sources such as analog broadcasting stations or digital broadcasting stations. A broadcast signal received via the tuner 240 is decoded (e.g., audio decoding, video decoding, or additional information decoding) and separated into audio, video, and/or additional information. The separated audio, video, and/or additional information may be stored in the image display device 200 under control of the controller 210.

The tuner 240 of the image display device 200 may be single or plural in number. The tuner 240 may be implemented as all-in-one (i.e., integral) with the image display device 200, or implemented as a separate device (e.g., a set-top box (not shown) having a tuner) electrically connected to the image display device 200 or as a tuner (not shown) connected to the I/O interface 270.

The video processor 280 processes video data received by the image display device 200. The video processor 280 may perform various types of image processing, such as decoding, scaling, noise filtering, frame rate conversion, and resolution conversion, on the video data.

The display 220 displays video included in a broadcast signal received via the tuner 240 on a screen under control of the controller 210. In addition, the display 220 may display content (e.g., video) input via the communication interface 250 or the I/O interface 270. The display 220 may display an image stored in the storage 290 under control of the controller 210. In addition, the display 220 may display a voice user interface (UI) (e.g., including a voice command guide) for performing a voice recognition task that corresponds to voice recognition or a motion UI (e.g., including a user motion guide for motion recognition) for performing a motion recognition task that corresponds to motion recognition.

The audio processor 215 processes audio data. The audio processor 215 may perform various types of processing, such as decoding, amplification, and noise filtering, on the audio data. The audio processor 215 may include a plurality of audio processing modules for processing audio that corresponds to a plurality of pieces of content.

The audio output interface 225 outputs audio included in a broadcast signal received via the tuner 240, under control of the controller 210. The audio output interface 225 may output audio (e.g., a voice or sound) input via the communication interface 250 or the I/O interface 270. In addition, the audio output interface 225 may output audio stored in the storage 290, under control of the controller 210. The audio output interface 225 may include at least one of a speaker 226, a headphone output terminal 227, and a Sony/Philips digital interface (S/PDIF) output terminal 228. The audio output interface 225 may include a combination of the speaker 226, the headphone output terminal 227, and the S/PDIF output terminal 228.

The power supply 260 supplies power input from an external power source to the internal components 210 to 290 of the image display device 200, under control of the controller 210. Alternatively, the power supply 260 may supply power input from one or more batteries (not shown) located inside the image display device 200 to the internal components 210 to 290, under control of the controller 210.

The sensor 230 senses a voice of the user, an image of the user, and/or an interaction of the user.

A microphone 231 receives a voice signal uttered by the user. The microphone 231 may convert the received voice signal into an electrical signal and output the converted electrical signal to the controller 210. The user's voice may include, for example, a voice signal that corresponds to a menu or function of the image display device 200. The microphone 231 may be implemented by being integrated with or separated from the image display device 200. The separated microphone 231 may be electrically connected to the image display device 200 via the communication interface 250 or the I/O interface 270.

A camera 232 receives an image (e.g., continuous frames) that corresponds to a motion of the user, including a gesture, within a camera recognition range. The motion of the user may include, for example, a motion of a part of the body of the user, such as a face, an expression, a hand, a fist, or a finger of the user, or a portion of the user. The camera 232 may convert the received image into an electrical signal and output the converted electrical signal to the controller 210, under control of the controller 210.

The controller 210 may select a menu displayed on the image display device 200 by using a recognition result of a received motion, or perform control that corresponds to the motion recognition result. For example, the control corresponding to the motion recognition result may include channel adjustment, volume adjustment, indicator movement, or cursor movement.

An optical receiver 233 receives an optical signal (including a control signal) from an external control device through an optical window (not shown) on a bezel of the display 220. The optical receiver 233 may receive an optical signal that corresponds to a user input (e.g., a touch, a push, a touch gesture, a voice, or a motion) from the external control device. A control signal may be extracted from the received optical signal under control of the controller 210.

The I/O interface 270 receives video (e.g., a moving picture), audio (e.g., a voice or music), and additional information (e.g., an EPG), and the like from the outside of the image display device 200 under control of the controller 210. The I/O interface 270 may include one of a high definition multimedia interface (HDMI) port 271, a component jack 272, a PC port 273, and a universal serial bus (USB) port 274. The I/O interface 270 may include a combination of the HDMI port 271, the component jack 272, the PC port 273, and the USB port 274.

It will be easily understood by those of ordinary skill in the art that a configuration and operation of the I/O interface 270 may be implemented in any of various ways, according to exemplary embodiments.

The controller 210 controls a general operation of the image display device 200 and a signal flow between the internal components 210 to 290 of the image display device 200 and processes data. If an input of the user is received, or a previously set and stored condition is satisfied, the controller 210 may execute an operating system (OS) and various applications stored in the storage 290.

The controller 210 may include a random access memory (RAM) 281 used to store a signal or data input from the outside of the image display device 200 or used as a storage region that corresponds to various operations performed by the image display device 200, a read-only memory (ROM) 282 in which a control program for controlling the image display device 200 is stored, and a processor 283.

The processor 283 may include a graphic processing unit (GPU, not shown) for processing graphics corresponding to video. The processor 283 may be implemented by a system on chip (SoC) in which a core (not shown) and a GPU (not shown) are integrated.

A GPU 284 generates a screen image including various objects, such as an icon, an image, and a text, by using a computation unit (not shown) and a renderer (not shown). The computation unit computes attribute values, such as a coordinate value, a shape, a size, and a color by which each object is to be displayed, according to a layout of a screen image by using a user interaction sensed by the sensor 230. The renderer generates various layouts of screen images that include objects based on the attribute values computed by the computation unit. A screen image generated by the renderer is displayed in a display area of the display 220.

First to nth interfaces 285-1 to 285-n are connected to the various components described above. One of the first to nth interfaces 285-1 to 285-n may be a network interface which is connected to an external device via a network.

The RAM 281, the ROM 282, the processor 283, the GPU 284, and the first to nth interfaces 285-1 to 285-n may be connected to each other via an internal bus 286.

In the present exemplary embodiment, the term "controller" may include the processor 283, the ROM 282, and the RAM 281.

The storage 290 may store various data, programs, or applications for operating and controlling the image display device 200 under control of the controller 210. The storage 290 may store signals or data input/output in correspondence with operations of the video processor 280, the display 220, the audio processor 215, the audio output interface 225, the power supply 230, the tuner 240, the communication interface 250, the sensor 230, and the I/O interface 270. The storage 290 may store control programs for controlling the image display device 200 and the controller 210, applications initially provided from a manufacturer or downloaded from the outside, graphic user interfaces (GUIs) related to the applications, objects (e.g., image text, icons, and buttons) for providing the GUIs, user information, documents, databases (DBs), or related data.

According to an exemplary embodiment, the term "storage" includes the storage 290, the ROM 282 of the controller 210, the RAM 281 of the controller 210, or a memory card (e.g., a micro secure digital (SD) card or a USB memory, not shown) mounted in the image display device 200. In addition, the storage 290 may include a nonvolatile memory, a volatile memory, a hard disk drive (HDD), or a solid state drive (SSD).

The storage 290 may include any of a broadcast reception module, a channel control module, a volume control module, a communication control module, a voice recognition module, a motion recognition module, an optical reception module, a display control module, an audio control module, an external input control module, a power control module, a power control module for an external device connected in a wireless manner (e.g., Bluetooth), a voice DB, and/or a motion DB which are not shown. The not-shown modules and DBs of the storage 290 may be implemented in a software form in order to perform, by the image display device 200, a broadcast reception control function, a channel control function, a volume control function, a communication control function, a voice recognition function, a motion recognition function, an optical reception control function, a display control function, an audio control function, an external input control function, a power control function, and/or a power control function for an external device connected in a wireless manner (e.g., Bluetooth), The controller 210 may perform each function by using the above-described software modules stored in the storage 290.

In addition, the image display device 200 having the display 220 may be electrically connected to a separate external device having a tuner. For example, it will be easily understood by those of ordinary skill in the art that the image display device 200 may be implemented by any of an analog TV, a digital TV, a 3D TV, a smart TV, an LED TV, an OLED TV, a plasma TV, a monitor, or the like but is not limited thereto.

The block diagrams of the image display devices 100 and 200 shown in FIGS. 2 and 3 are only illustrative. Each component in the block diagrams may be integrated, added, or omitted according to the actually implemented specifications of the image display devices 100 and 200. In this aspect, according to circumstances, two or more components may be integrated into one component, or one component may be separated into two or more components. In addition, the functions performed in each block are to describe exemplary embodiments, and detailed operations or devices thereof do not limit the proper scope of the present inventive concept.

Figure 4:
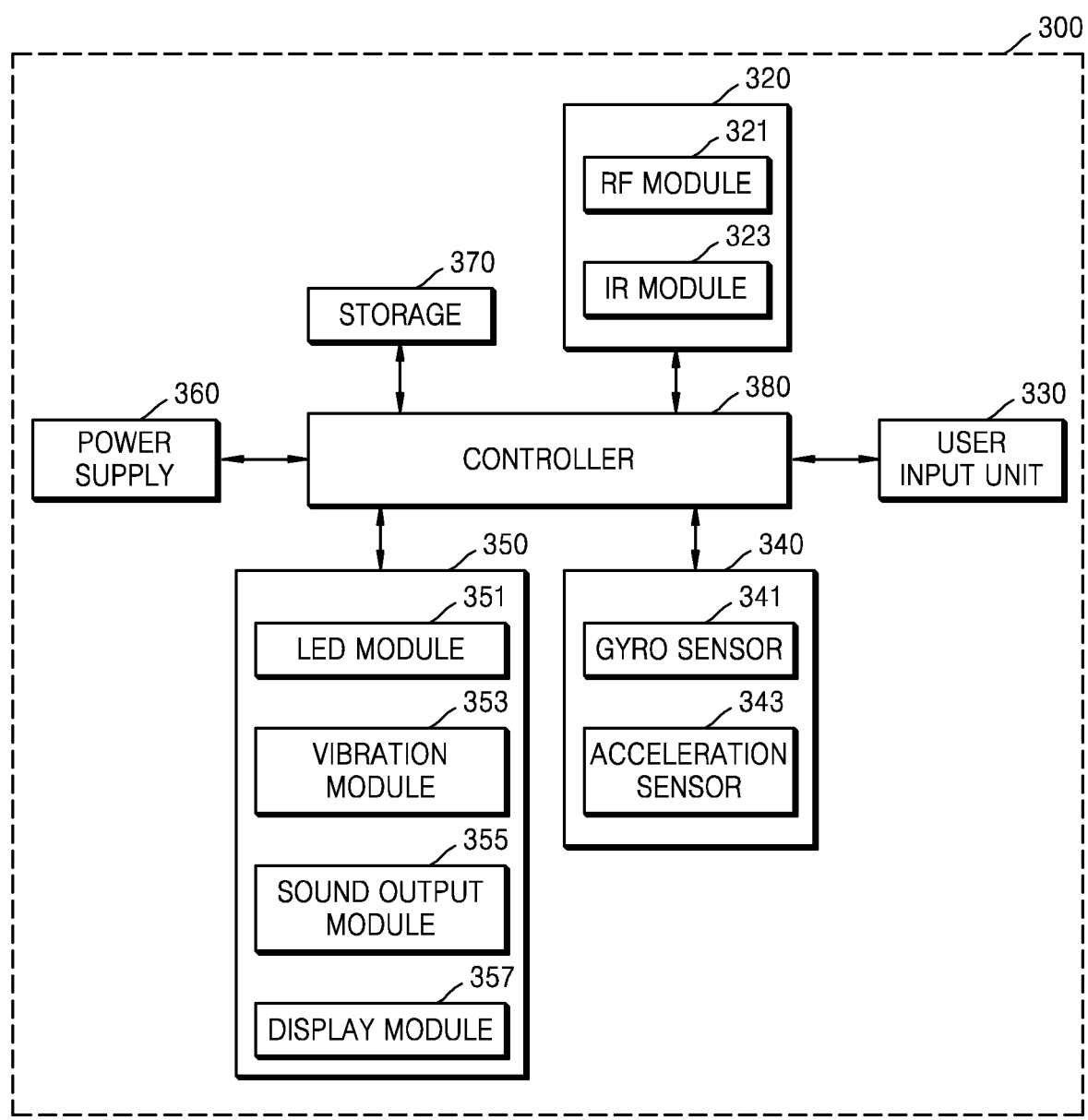
FIG. 4 is a block diagram of the control device, according to an exemplary embodiment.

FIG. 4 is a block diagram of the control device 300, according to an exemplary embodiment.

Referring to FIG. 4, the control device 300 may include a wireless communication interface 320, a user input unit (also referred to herein as a "user input device") 330, a sensor 340, an output unit (also referred to herein as an "output device") 350, a power supply 360, a storage 370, and a controller 380.

The wireless communication interface 320 may transmit/receive a signal to/from any one of the image display devices 100 and 200 according to the exemplary embodiments described above. The wireless communication interface 320 may include a radio frequency (RF) module 321 that is capable of transmitting/receiving a signal to/from the image display device 100 according to an RF communication standard. In addition, the wireless communication interface 320 may include an infrared (IR) module 323 that is capable of transmitting/receiving a signal to/from the image display device 100 according to an IR communication standard.

The control device 300 may transmit a command related to any of various functions, such as, for example, power on/off, channel switching, volume change, or the like to the image display device 100 via the IR module 323 according to circumstances.

The user input unit 330 may include any of a keypad, buttons, a touch pad, a touch screen, or the like. The user may input a command related to the image display device 100 into the control device 300 by operating the user input unit 330. When the user input unit 330 includes hard key buttons, the user may input a command related to the image display device 100 into the control device 300 via an operation of pressing a hard key button. When the user input unit 330 includes a touch screen, the user may input a command related to the image display device 100 into the control device 300 by touching a soft key of the touch screen. For example, the user input unit 330 may include a channel-up key and/or a channel-down key for changing a channel. The channel-up key and/or the channel-down key may include a hard key button, a soft key, a scroll wheel, or the like. In addition, the user input unit 330 may include various types of input means operable by the user, such as a scroll key and a jog key.

When the channel-up key and/or the channel-down key includes a scroll wheel, a continuous scroll-up input of moving the scroll wheel upwards a preset number of times or more or a continuous scroll-down input of moving the scroll wheel downwards a preset number of times or more may correspond to a long press input on the channel-up key or the channel-down key, according to an exemplary embodiment. In addition, a case in which there is no scroll input for a predetermined amount of time after the continuous scroll-up input or the continuous scroll-down input may correspond to an input of releasing the channel-up key or the channel-down key, according to an exemplary embodiment.

In addition, the user input unit 330 may include a touch pad. According to an exemplary embodiment, the user input unit 330 may receive a user input, such as a drag, a touch, or a flip, via the touch pad of the control device 300. In this case, the image display device 100 may be controlled according to a type (e.g., an input direction of a drag command, or a time for which a touch command is input) of the received user input.

For example, a drag input on the touch pad may correspond to a long press input on the channel-up key and/or the channel-down key, according to an exemplary embodiment, and an input of releasing a touch tool or the like from the touch pad after dragging may correspond to an input of releasing the channel-up key or the channel-down key, according to an exemplary embodiment.

The sensor 340 may include a gyro sensor 341 or an acceleration sensor 343. The gyro sensor 341 may sense information that relates to a motion of the control device 300. The acceleration sensor 343 may sense information that relates to a moving speed and the like of the control device 300. The sensor 340 may further include a distance measurement sensor which may sense a distance to the image display device 100.

The output unit 350 may output an image or voice signal that corresponds to an operation of the user input unit 330 or to a signal received from the image display device 100. The user may recognize whether the user input unit 330 is operated or whether the image display device 100 is controlled, via the output unit 350.

For example, the output unit 350 may include any of an LED module for emitting light, a vibration module for generating vibrations, a sound output module for outputting a sound, or a display module for outputting an image, when the user input unit 330 is operated or when a signal is transmitted to or received from the image display device 100 via the wireless communication interface 320.

The power supply 360 supplies power to the control device 300.

The storage 370 may store various types of programs, applications, data, and the like which are required to control or operate the control device 300.

The controller 380 controls a general operation related to control of the control device 300. The controller 380 may transmit a signal that corresponds to a predetermined key operation of the user input unit 330 or a signal that corresponds to a motion of the control device 300, which has been sensed by the sensor 340, to the image display device 100 via the wireless communication interface 320.

The signal transmitted from the control device 300, which has been sensed by the sensor 110, is transmitted to the processor 120 of the image display device 100. The processor 120 may determine information related to an operation and a key operation of the control device 300 based on the signal transmitted from the control device 300, and control the image display device 100 according to a result of the determination.

FIGS. 5A, 5B, 5C, 5D, and 5E illustrate images displayed on the image display device 100, according to an exemplary embodiment.

Figure 5A:
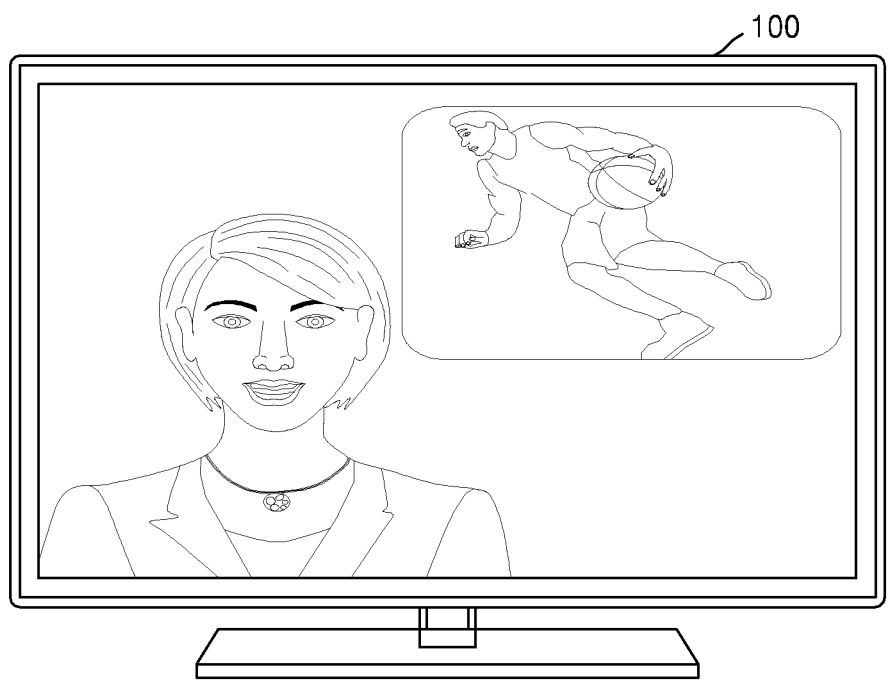
FIGS. 5A, 5B, 5C, 5D, and 5E illustrate images displayed on the image display device, according to an exemplary embodiment.
Figure 5A:
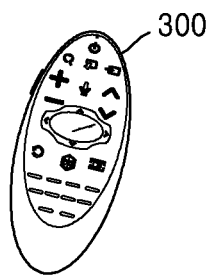

Referring to FIG. 5A, the image display device 100 according to an exemplary embodiment may receive a control signal from the control device 300 and may be controlled based on the received control signal.

The control device 300 according to an exemplary embodiment may transmit/receive a signal to/from the image display device 100 based on an IR or RF communication standard. However, the present exemplary embodiment is not limited thereto. The control device 300 may include a channel-up key and/or a channel-down key or the like. The channel-up key and/or the channel-down key may include a hard key button or a soft key. Alternatively, the channel-up key and/or the channel-down key may include a scroll wheel.

The user may input a command related to the image display device 100 into the control device 300 by operating a key of the control device 300. For example, the user may input a command (e.g., a command of switching to a subsequent or previous channel) related to the image display device 100 into the control device 300 via an operation of pressing or touching the channel-up or channel-down key.

Figure 5B:
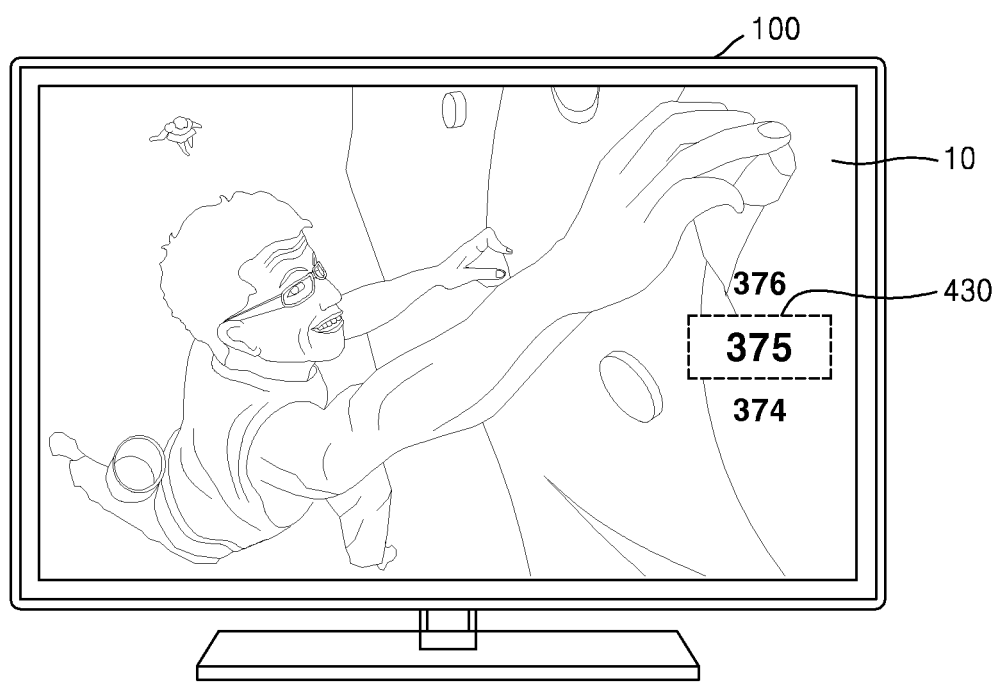
Figure 5B:
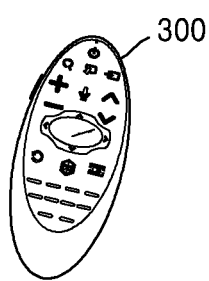

The control device 300 may transmit a control signal that corresponds to a user command to the image display device 100, and the image display device 100 may switch a current channel to a subsequent channel or a previous channel in response to the control signal. For example, as shown in FIG. 5A, the image display device 100 may receive a channel-up key input signal from the control device 300 in a state in which an image related to a current channel (e.g., a channel number "374") is displayed. When the image display device 100 receives a channel-up key input signal, the image display device 100 may switch the current channel (e.g., the channel number "374") to a subsequent channel (e.g., a channel number "375") as shown in FIG. 5B. The image display device 100 may receive a broadcast signal that corresponds to the subsequent channel (e.g., the channel number "375") and display an image that corresponds to the subsequent channel (e.g., the channel number "375") on the display 130. Alternatively, when the image display device 100 receives a channel-down key input signal, the image display device 100 may switch the current channel to a previous channel.

In addition, the image display device 100 may display channel information that corresponds to a switched channel. For example, the image display device 100 may display a channel number 430 (e.g., the channel number "375") of the switched channel as shown in FIG. 5B and may display a previous channel number (e.g., the channel number "374") and a subsequent channel number (e.g., a channel number "376") of the switched channel together.

In addition, when no input is received for a predetermined time interval after channel switching, the image display device 100 may end the channel information display.

Figure 5C:
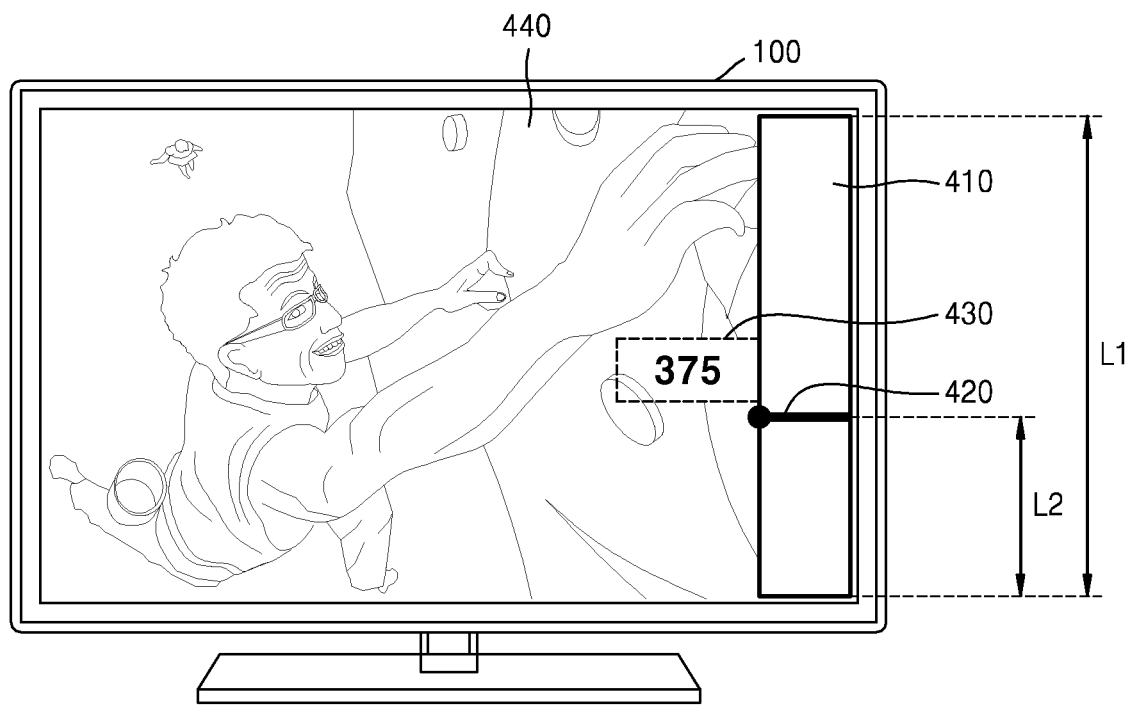

According to an exemplary embodiment, when the image display device 100 receives an input signal of pressing the channel-up key or the channel-down key for a long time from the control device 300, the image display device 100 may display a channel scroll bar 410 and a channel indicator 420 as shown in FIG. 5C. Alternatively, when the image display device 100 receives an input signal of continuously pressing the channel-up key or the channel-down key a preset number of times from the control device 300, the image display device 100 may display the channel scroll bar 410 and the channel indicator 420. Alternatively, when the image display device 100 receives a specific key input, the image display device 100 may display the channel scroll bar 410 and the channel indicator 420. However, the present exemplary embodiment is not limited thereto.

Although FIG. 5C shows that the channel scroll bar 410 is displayed in the form of a vertical scroll bar on the right side of the display 130, the channel scroll bar 410 is not limited thereto and may be displayed on the left side, the top portion, the bottom portion, or the like of the display 130 and displayed in the form of a horizontal scroll bar. In addition, the channel indicator 420 may be displayed on the channel scroll bar 410.

In addition, the channel scroll bar 410 may include a plurality of points to which the channel indicator 420 is movable. The plurality of points may correspond to a plurality of channels stored in the image display device 100, respectively. For example, when all channels stored in the image display device 100 are 1000 channels from a channel number "1" to a channel number "1000", the channel scroll bar 410 may include a first to $1000^{th}$ points. In this case, a distance between adjacent points may be the same.

The image display device 100 may determine a channel that corresponds to a point on the channel scroll bar 410 at which the channel indicator 420 is located and display channel information 430 that corresponds to the determined channel on the display 130. In this case, the image display device 100 may determine a channel that corresponds to a point at which the channel indicator 420 is located, based on a relative location of the channel indicator 420 on the channel scroll bar 410. For example, when a ratio (L2/L1) of a distance L2 between a start point of the channel scroll bar 410 and a point at which the channel indicator 420 is located to a total size L1 of the channel scroll bar 410 is 0.375, the image display device 100 may determine a $375^{th}$ channel from among the total 1000 channels as a channel that corresponds to the point at which the channel indicator 420 is located. In addition, the image display device 100 may display the channel information 430 (e.g., the channel number "375") of the $375^{th}$ channel on the display 130.

In addition, the channel indicator 420 may indicate a location of a channel that corresponds to the channel information 430 displayed on the display 130 from among all the channels. For example, the total size L1 corresponds to the total number of channels stored in the image display device 100, and the distance L2 between the start point of the channel scroll bar 410 and the point at which the channel indicator 420 is located may correspond to an order of the channel that corresponds to the channel information 430 from among all the channels.

For example, as shown in FIG. 5C, when the channel that corresponds to the channel information 430 (e.g., the channel number "375") displayed on the display 130 is the $375^{th}$ channel from among all the channels (i.e., from the channel number "1" to the channel number "1000"), L2/L1 may be equal to 0.375. In addition, the point at which the channel indicator 420 is located may be a $375^{th}$ point from among the first to $1000^{th}$ points.

In addition, when the image display device 100 continuously receives an input signal of pressing the channel-up key or the channel-down key for a long time, the image display device 100 may move the channel indicator 420 in the first direction or the second direction along the channel scroll bar 410. In addition, the image display device 100 may change the channel information 430 displayed on the display 130. For example, when the image display device 100 continuously receives an input signal of pressing the channel-up key for a long time, the image display device 100 may move the channel indicator 420 upwards along the channel scroll bar 410. In this case, the image display device 100 may move the channel indicator 420 by a predetermined distance on the channel scroll bar 410. For example, the image display device 100 may move the channel indicator 420 from a current point at which the channel indicator 420 is located to an upwardly adjacent point from among the plurality of points. In addition, a time required to move the channel indicator 420 from a start point to an end point from among the plurality of points may be constant, regardless of a total number of channels stored in the image display device 100.

Figure 5D:
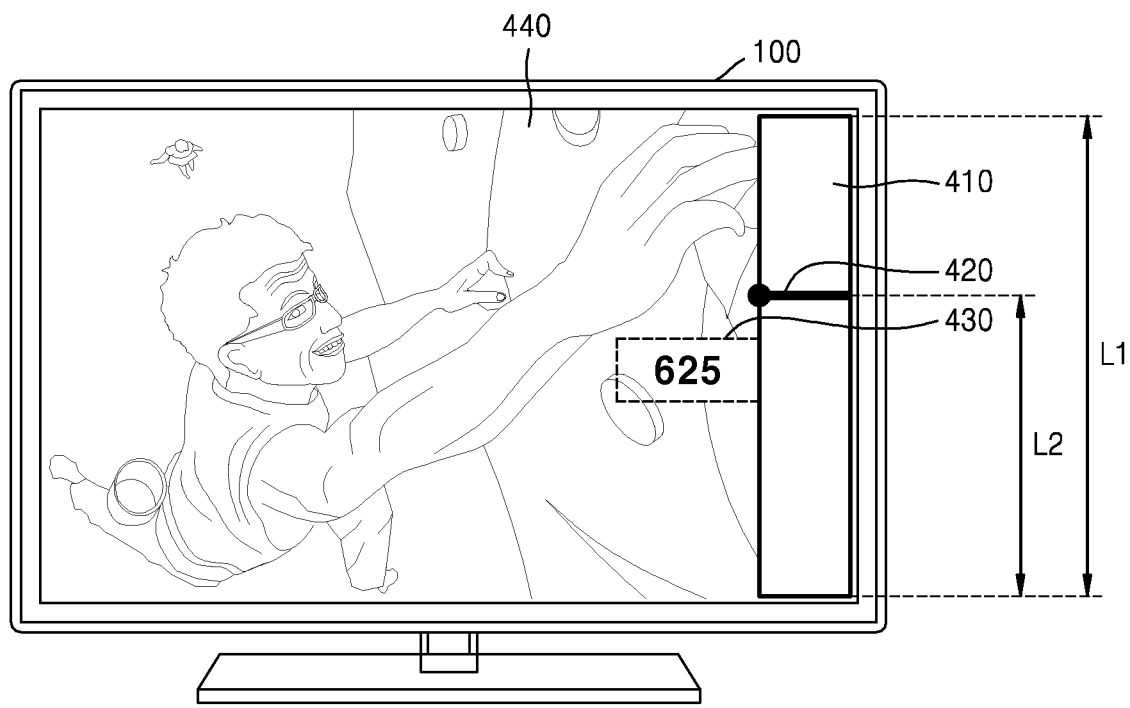
Figure 5D:
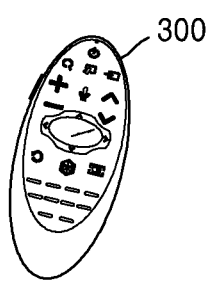

In addition, every time the channel indicator 420 moves to an adjacent point, the image display device 100 may continuously change a channel number to a subsequent or previous channel number. For example, the image display device 100 may change a channel number in the order of 376, 377, . . . , 624, and 625 in conjunction with the movement of the channel indicator 420 as shown in FIG. 5D. In addition, when a channel number "625" is displayed on the image display device 100, the channel indicator 420 may be located at a $625^{th}$ point on the channel scroll bar 410 from among the plurality of points. In addition, L2 (from the start point of the channel scroll bar 410 to a point at which the channel indicator 420 is located)/L1 (the total size of the channel scroll bar 410) may be equal to 0.625.

While maintaining the long press input on the channel-up key or the channel-down key (for example, while moving the channel indicator 420 on the channel scroll bar 410), the image display device 100 may not change an image of a channel, which is being displayed on the display 130. For example, referring to FIGS. 5C and 5D, while a channel number is being changed from "375" to "625", the image display device 100 may continuously display an image 440 that corresponds to the channel number "375". However, the present exemplary embodiment is not limited thereto.

According to an exemplary embodiment, an input signal of pressing the channel-up key for a long time may include a plurality of continuous press key signals. The image display device 100 may switch a current channel to a subsequent channel as described above with reference to FIG. 5B, in response to a first press key signal from among the plurality of press key signals. In addition, the image display device 100 may only change channel information to subsequent channel information without switching a channel while moving the channel indicator 420 on the channel scroll bar 410 as shown in FIGS. 5C and 5D, in response to the second and subsequent press key signals from among the plurality of press key signals.

According to an exemplary embodiment, the image display device 100 may receive, from the control device 300, an input signal of releasing the channel-up key or the channel down key which has been pressed for a long time. When an input of releasing the channel-up key or the channel down key is received, the image display device 100 may switch a current channel to a channel that corresponds to a point on the channel scroll bar 410 at which the channel indicator 420 is located. For example, the image display device 100 may determine a point at which the channel indicator 420 is located at a time point when an input of releasing the channel-up or channel down key is received, and switch to a channel that corresponds to the point at which the channel indicator 420 is located.

Figure 5E:
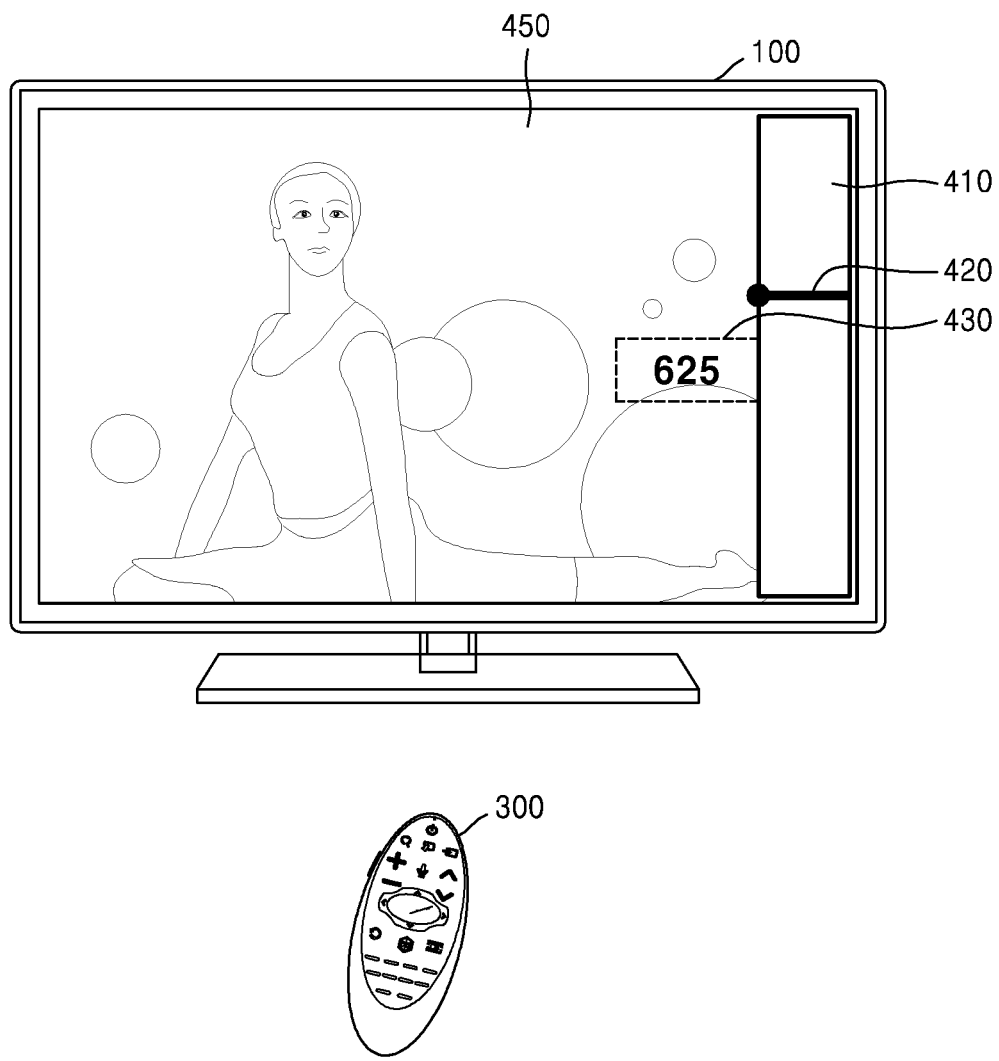

For example, as shown in FIG. 5E, when the channel indicator 420 is located at the $625^{th}$ point on the channel scroll bar 410 at a time point when an input of releasing the channel-up key or the channel down key is received, and a channel that corresponds to the $625^{th}$ point has the channel number "625", the image display device 100 may switch a current channel (e.g., the channel number "375") to a channel of the channel number "625". The image display device 100 may receive a broadcast signal that corresponds to the channel number "625" and display an image 450 that corresponds to the channel number "625" on the display 130.

The image display device 100 may end displaying the channel scroll bar 410 and the channel indicator 420 if no key input is received after the channel switching.

Figure 6A:
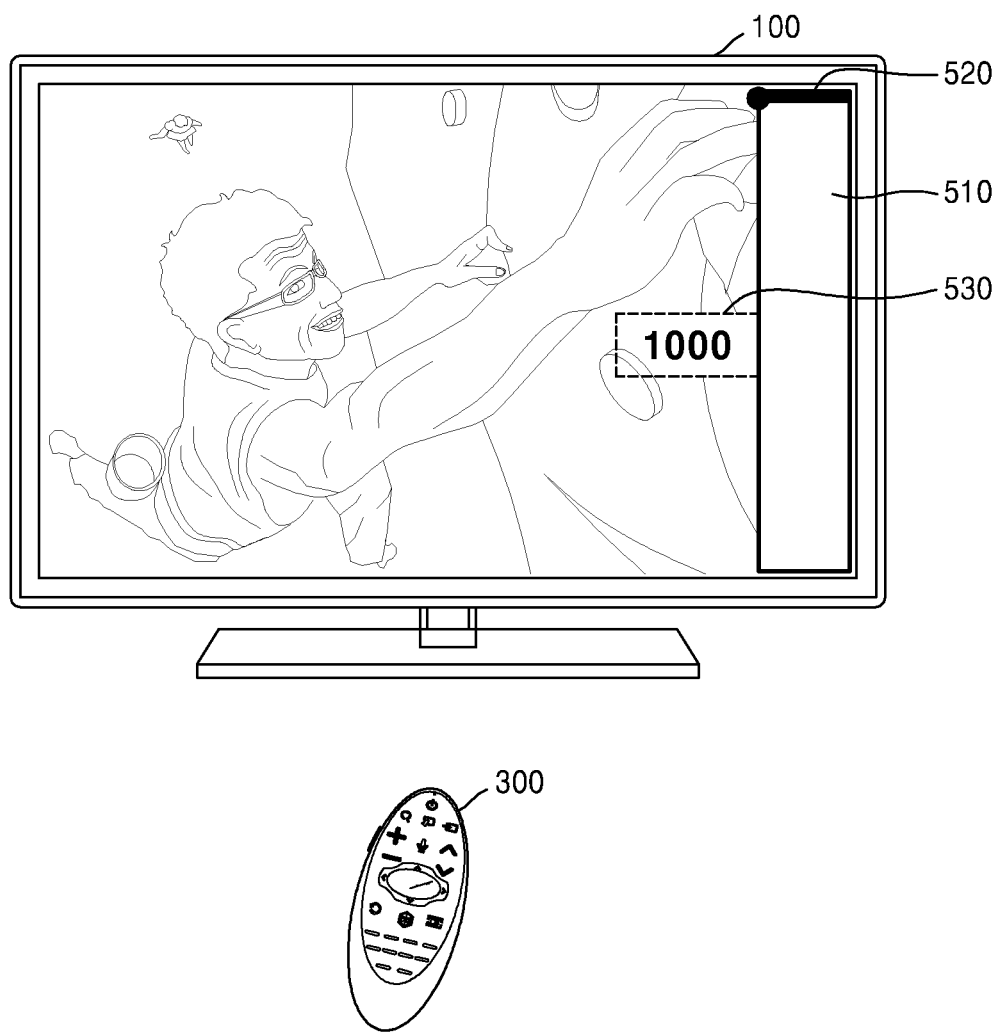
FIGS. 6A and 6B illustrate images displayed on the image display device, according to an exemplary embodiment.
Figure 6B:
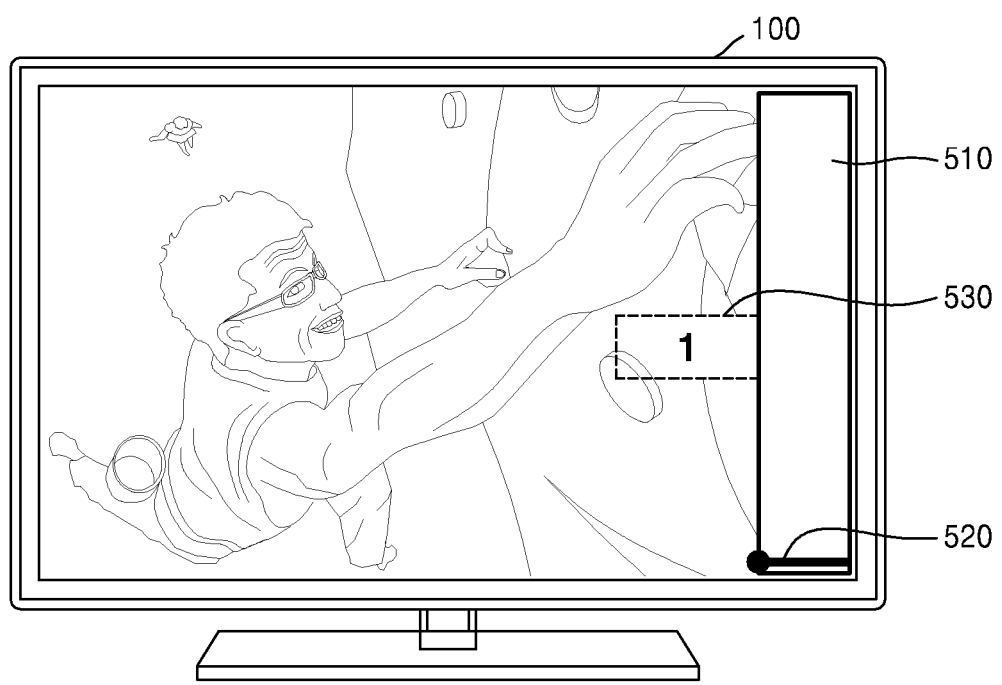
Figure 6B:
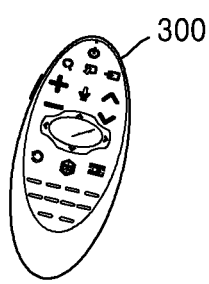

FIGS. 6A and 6B illustrate images displayed on the image display device 100, according to an exemplary embodiment.

According to an exemplary embodiment, the image display device 100 may move a channel indicator 520 upwards on a channel scroll bar 510 in response to a long press input on the channel-up key. As continuously moving the channel indicator 520 upwards, the channel indicator 520 may be located at an end point (e.g., a $1000^{th}$ point) from among a plurality points included in the channel scroll bar 510, as shown in FIG. 6A. When the channel indicator 520 is located at the end point, the image display device 100 may display channel information 530 (e.g., a channel number "1000") which corresponds to a last channel (e.g., a $1000^{th}$ channel) from among all channels (e.g., a first to $1000^{th}$ channel). However, the present exemplary embodiment is not limited thereto.

When the channel indicator 520 is located at the end point, if an input of continuously pressing the channel-up key for a long time is received, the image display device 100 may move the channel indicator 520 from the end point (e.g., the $1000^{th}$ point) to a start point (e.g., the first point) from among the plurality of points, as shown in FIG. 6B. When the channel indicator 520 is located at the start point, the image display device 100 may display, on the display 130, the channel information 530 (e.g., a channel number "1") which corresponds to a first channel (e.g., the first channel) from among all the channels (e.g., the first to $1000^{th}$ channel).

Alternatively, when the image display device 100 continuously moves the channel indicator 520 downwards on the channel scroll bar 510 in response to a long press input on the channel-down key, the channel indicator 520 may be located at the start point from among the plurality of points as shown in FIG. 6B. When the channel indicator 520 is located at the start point, if an input of continuously pressing the channel-down key for a long time is received, the image display device 100 may move the channel indicator 520 from the start point to the end point, as shown in FIG. 6A.

Figure 7A:
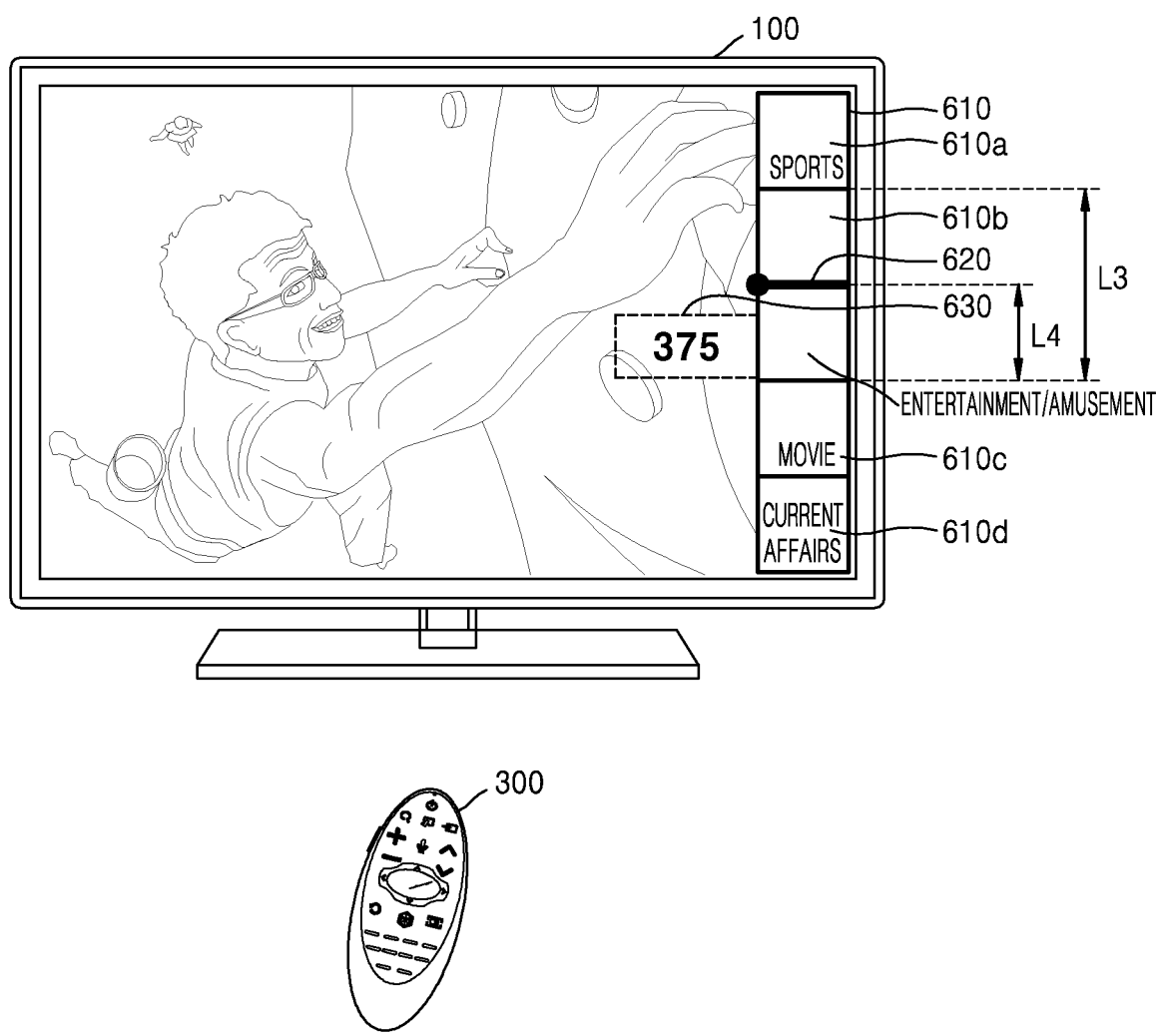
FIGS. 7A, 7B, and 7C illustrate images displayed on the image display device, according to an exemplary embodiment.
Figure 7B:
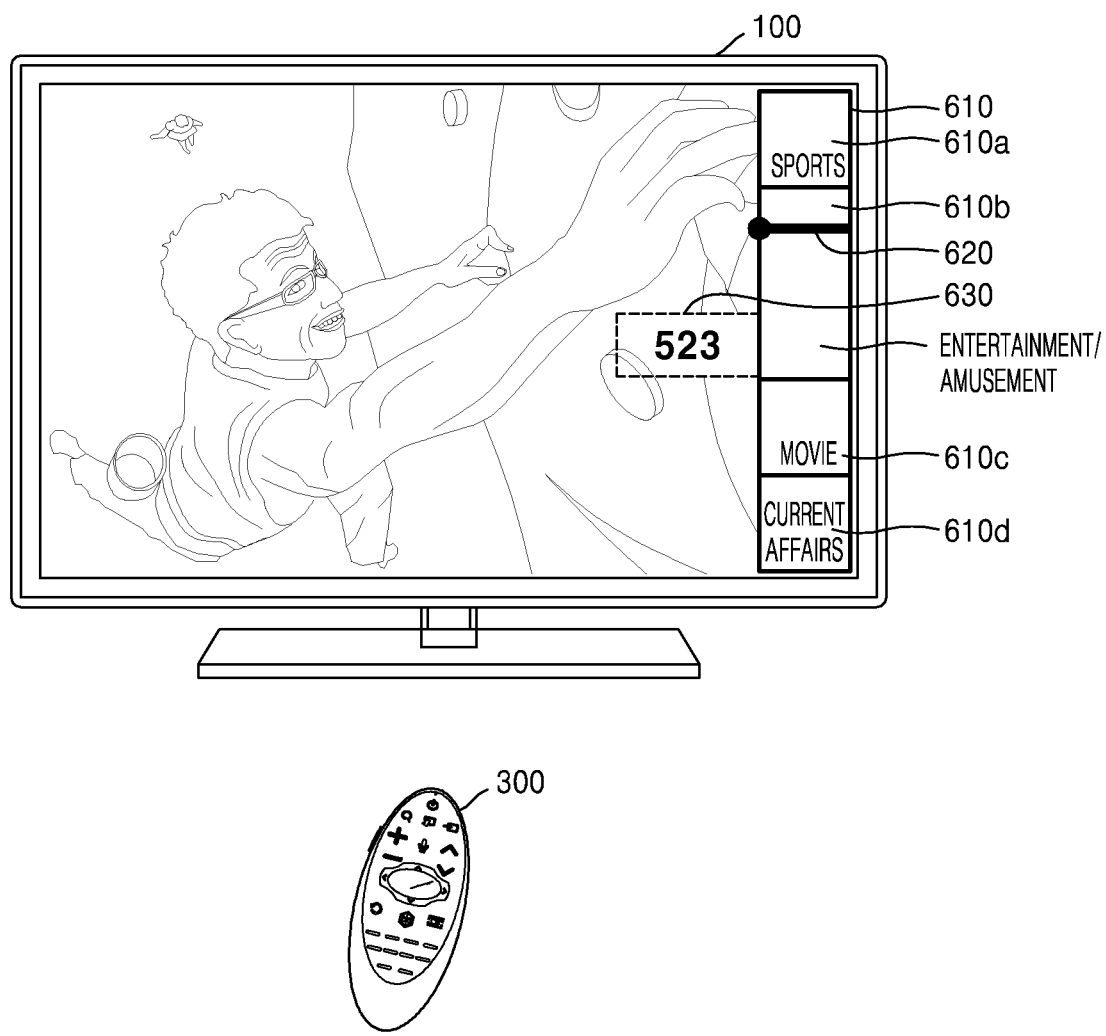
Figure 7C:
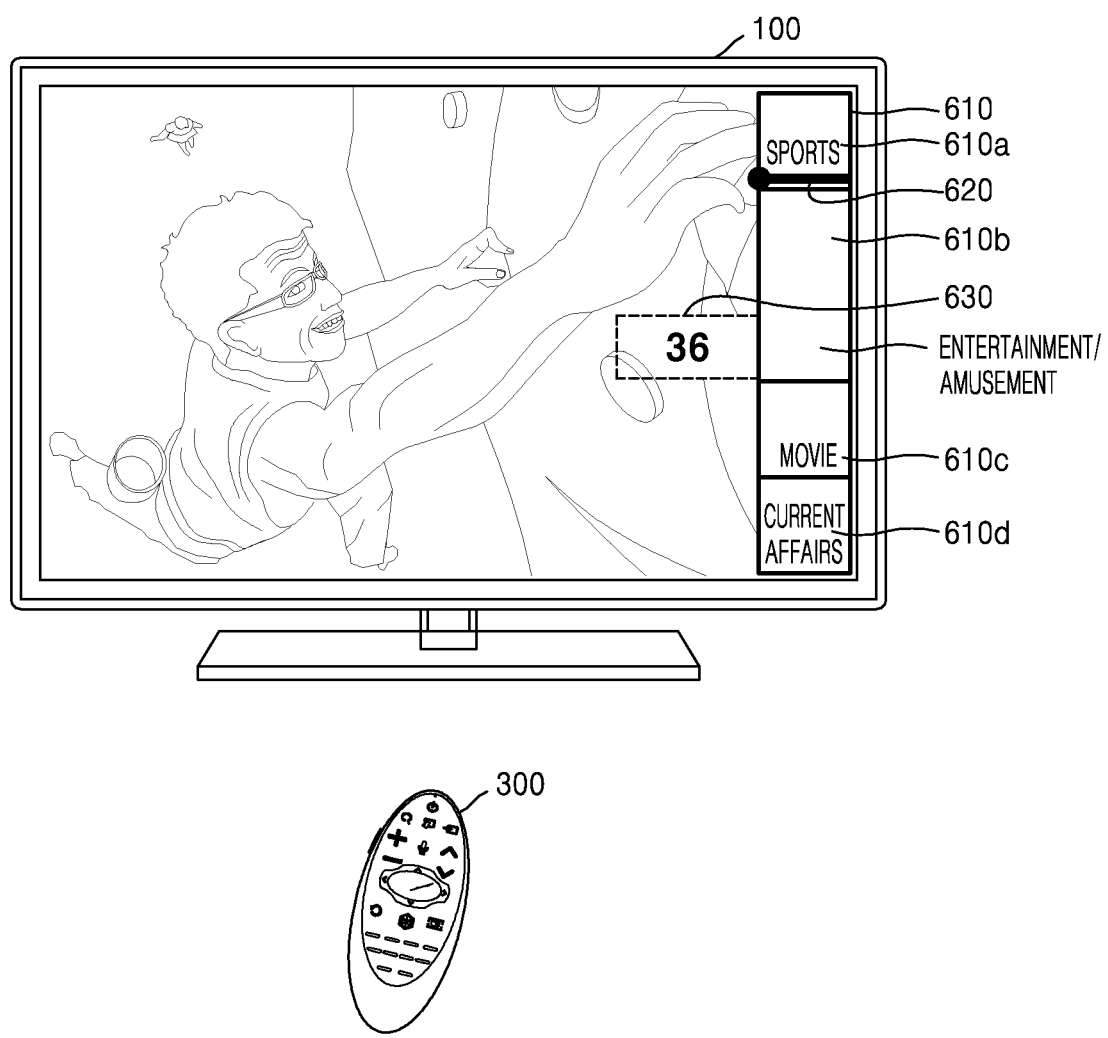

FIGS. 7A, 7B, and 7C illustrate images displayed on the image display device 100, according to an exemplary embodiment.

Referring to FIG. 7A, according to an exemplary embodiment, when the image display device 100 receives an input signal of pressing the channel-up key or the channel-down key for a long time from the control device 300, the image display device 100 may display a channel scroll bar 610 and a channel indicator 620. In this case, the channel scroll bar 610 may include a plurality of (first to fourth) regions 610a, 610b, 610c, and 610d. Each of the plurality of regions 610a, 610b, 610c, and 610d may correspond to a channel group.

The image display device 100 may divide all channels stored in the image display device 100 into a plurality of channel groups according to a specific criterion. For example, the image display device 100 may generate a plurality of channel groups by grouping a plurality of channels according to types of content to be provided via the channels. In this case, the plurality of channel groups may include, for example, any of a movie channel group, a sports channel group, an entertainment/amusement channel group, a current affairs channel group, and the like.

Alternatively, the image display device 100 may generate a plurality of channel groups by grouping a plurality of channels according to sources of broadcast signals. In this case, the plurality of channel groups may include, for example, any of a terrestrial broadcast channel group, a cable broadcast channel group, a satellite broadcast channel group, an Internet broadcast channel group, and the like.

Referring back to FIG. 7A, the image display device 100 may make channels belonging to a first channel group (e.g., the sports channel group) from among the plurality of channel groups correspond to the first region 610a, channels belonging to a second channel group (e.g., the entertainment/amusement channel group) correspond to the second region 610b, channels belonging to a third channel group (e.g., the movie channel group) correspond to the third region 610c, and channels belonging to a fourth channel group (e.g., the current affairs channel group) correspond to the fourth region 610d. In this case, a size of a region that corresponds to a channel group may be proportional to the number of channels belonging to the channel group. In addition, the image display device 100 may receive a specific key input and change a display order of regions corresponding to channel groups.

As shown in FIG. 7A, when the image display device 100 receives an input signal of pressing the channel-up key or the channel-down key for a long time from the control device 300, the image display device 100 may display channel information 630 that corresponds to a subsequent or previous channel of a current channel on the display 130. For example, when the subsequent or previous channel has a channel number "375", the channel number "375" may be displayed on the display 130.

In addition, the image display device 100 may display the channel indicator 620 in a region that corresponds to a channel group to which the subsequent or previous channel belongs from among the plurality of regions 610a, 610b, 610c, and 610d. For example, when the subsequent or previous channel belongs to the entertainment/amusement channel group, the image display device 100 may display the channel indicator 620 in the second region 620b.

In addition, the image display device 100 may display the channel indicator 620 at a point that corresponds to an order of the subsequent or previous channel from among channels belonging to the channel group to which the subsequent or previous channel belongs. For example, a size L3 of the second region 610b may correspond to a total number of channels belonging to the entertainment/amusement channel group, and a distance L4 from a start point of the second region 610b to a point at which the channel indicator 620 is located may correspond to an order of a channel that corresponds to the channel number "375" from among the channels belonging to the entertainment/amusement channel group. For example, when the entertainment/amusement channel group includes 400 channels, and the channel that corresponds to the channel number "375" corresponds to a $200^{th}$ channel from among the 400 channels, L4/L3 may be equal to 0.5.

In addition, when an input signal of pressing the channel-up key or the channel-down key for a long time is continuously received, the image display device 100 may continuously move the channel indicator 620 upwards or downwards. In this case, when the channel indicator 620 is moved in the second region 610b, channel information that relates to the channels belonging to the entertainment/amusement channel group is displayed.

For example, when an input signal of pressing the channel-up key for a long time is continuously received, the image display device 100 may move the channel indicator 620 upwards in the second region 610b. In addition, the image display device 100 may change a channel number displayed on the display 130 to a channel number that corresponds to a subsequent channel of the currently displayed channel number according to a channel order of the channels belonging to the entertainment/amusement channel group and display the changed channel number. For example, the image display device 100 may change a channel number in the order of 375, 387, 396, 410, . . . , 520, and 523 according to the channel order of the channels belonging to the entertainment/amusement channel group, as shown in FIG. 7B. However, the present exemplary embodiment is not limited thereto.

In addition, when the channel indicator 620 is located at an end point of the second region 610b after continuously moving upwards or downloads, if an input of processing the channel-up or channel-down key for a long time is continuously received, the image display device 100 may move the channel indicator 620 to a start point of the first region 610a which is adjacent to the second region 610b. In addition, the image display device 100 may continuously move the channel indicator 620 upwards in the first region 610a. In this case, the image display device 100 may display a channel number (e.g., a channel number "36") of a channel that corresponds to a point at which the channel indicator 620 is located from among the channels belonging to the sports channel group (a channel group corresponding to the first region 610a), as shown in FIG. 7C.

While maintaining the long press input on the channel-up key or the channel-down key (for example, while moving the channel indicator 620 on the channel scroll bar 610), the image display device 100 may not change an image of a channel, which is being displayed on the display 130.

Figure 8A:
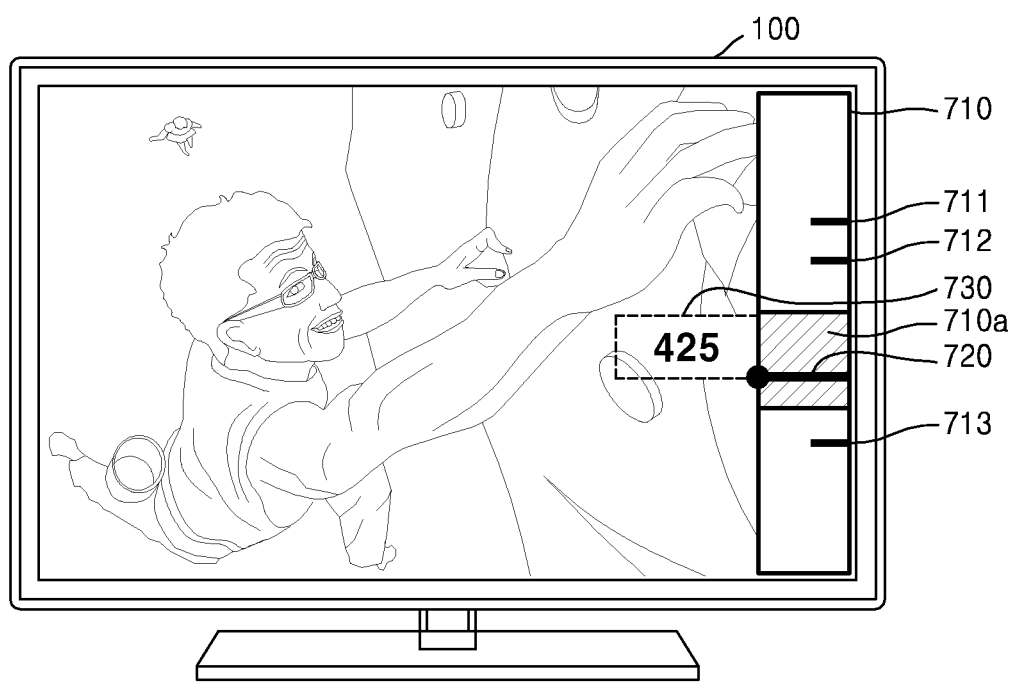
FIGS. 8A and 8B illustrate images referred to so as to describe a moving speed of a channel indicator on a channel scroll bar, according to an exemplary embodiment.
Figure 8A:
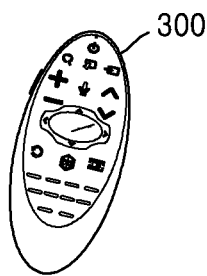
Figure 8B:
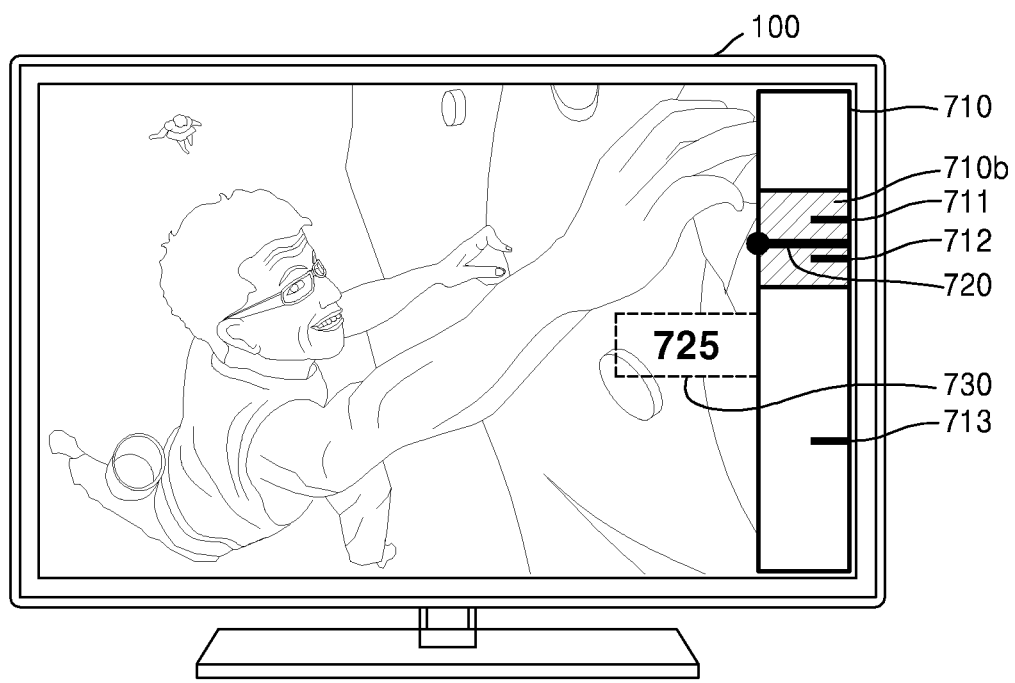
Figure 8B:
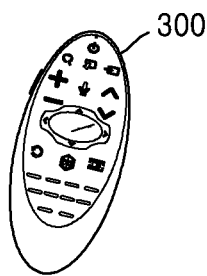

FIGS. 8A and 8B illustrate images referred to so as to describe a moving speed of a channel indicator 720 on a channel scroll bar 710, according to an exemplary embodiment.

Referring to FIG. 8A, according to an exemplary embodiment, when the image display device 100 receives an input signal of pressing the channel-up key or the channel down key for a long time from the control device 300, the image display device 100 may display the channel indicator 720 on the channel scroll bar 710 as shown in FIG. 8A. In this case, points that correspond to preferred channels may be displayed on the channel scroll bar 710. The preferred channels may include channel which the user frequently views or channels registered by the user by means of registering favorites. However, the present exemplary embodiment is not limited thereto.

For example, first, second, and third channels from among all channels stored in the image display device 100 may be stored as the preferred channels. In this case, as shown in FIG. 8A, specific objects 711, 712, and 713 may be displayed at a point that corresponds to the first channel, a point that corresponds to the second channel, and a point that corresponds to the third channel on the channel scroll bar 710.

Referring to FIGS. 8A and 8B, according to an exemplary embodiment, the image display device 100 may move the channel indicator 720 at a first speed in a first region 710a of the channel scroll bar 710 and at a second speed in a second region 710b. In this case, the first speed may be greater than the second speed.

For example, as shown in FIG. 8A, the first region 710a may not include the specific objects 711, 712, and 713, and the image display device 100 may move the channel indicator 720 at the first speed in the first region 710a which does not include points that correspond to a preferred channel.

As another example, as shown in FIG. 8B, the second region 710b may include the specific objects 711 and 712, and the image display device 100 may move the channel indicator 720 at the second speed, which is slower than the first speed, in the second region 710b which includes points that correspond to preferred channels.

Sizes of the first region 710a and the second region 710b may be variably set, and a moving speed of the channel indicator 720 in the first region 710a and a moving speed of the channel indicator 720 in the second region 710b may be set based on the sizes of the first region 710a and the second region 710b. In addition, a time required to move the channel indicator 720 all over the channel scroll bar 710 may be constant, regardless of the number of preferred channels and the sizes of the first region 710a and the second region 710b.

Alternatively, the image display device 100 may variably set a moving speed of the channel indicator 720 in a first time interval and a moving speed of the channel indicator 720 in a second time interval while receiving an input signal of pressing the channel-up key for a long time from the control device 300. For example, the image display device 100 may move the channel indicator 720 relatively quickly in an initial stage of an input and move the channel indicator 720 relatively slowly thereafter. However, the present exemplary embodiment is not limited thereto.

Figure 9:
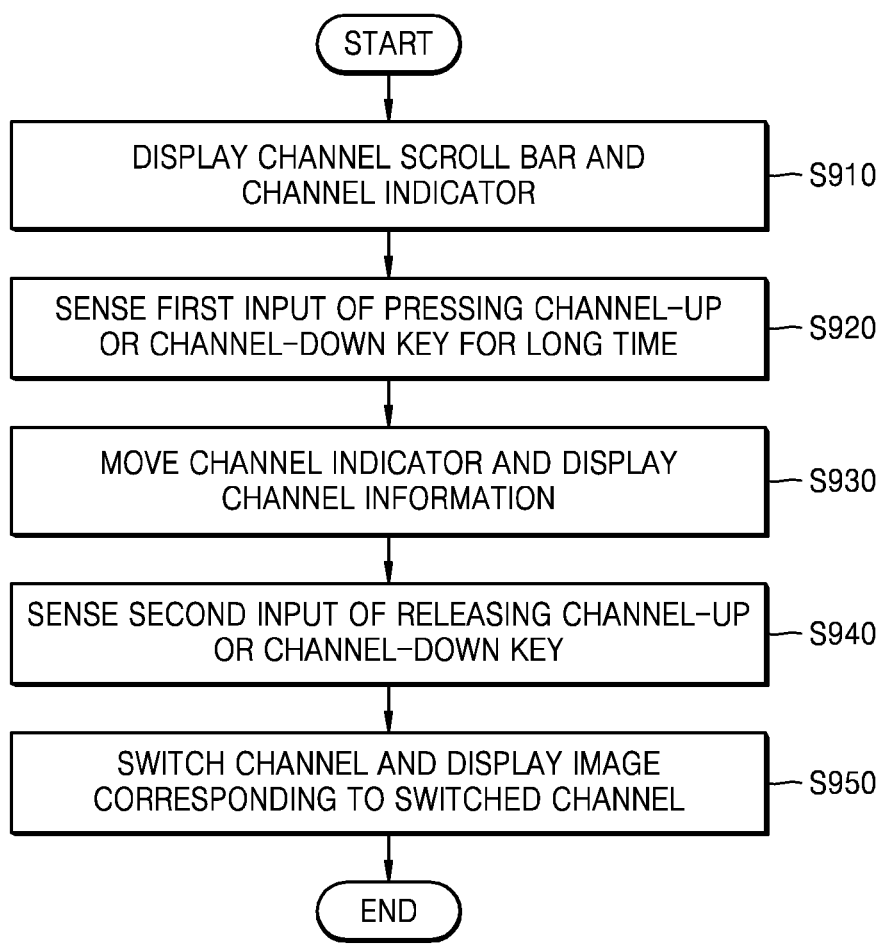
FIG. 9 is a flowchart of an operating method of an image display device, according to an exemplary embodiment.

FIG. 9 is a flowchart of an operating method of the image display device 100, according to an exemplary embodiment.

Referring to FIG. 9, in operation S910, the image display device 100 according to an exemplary embodiment may display a channel scroll bar and a channel indicator.

The image display device 100 may compare the number of channels stored in the memory 140 with a preset number in order to determine whether to display the channel scroll bar and the channel indicator.

The channel scroll bar may include a plurality of points which respectively correspond to the channels stored in the image display device 100, the channel indicator may be moved to the plurality of points, and a distance between adjacent points from among the plurality of points may be the same. In addition, a time required to move the channel indicator from a start point of the plurality of points to an end point thereof may be constant, regardless of the number of channels stored in the memory 140.

The image display device 100 may display channel information that relates to a channel that corresponds to a point at which the channel indicator is located on the channel scroll bar.

In operation S920, the image display device 100 may receive a first input of pressing the channel-up key or the channel-down key for a long time, i.e., for at least a predetermined amount of time.

In this case, an input of pressing a key for a long time indicates an input of maintaining a key press state for a threshold time or longer after pressing the key. For example, this indicates a case in which a time difference between a key press time point and a key release time point is the threshold time or longer.

In addition, when the channel-up key or the channel-down key includes a scroll wheel, a scroll-up input of continuously moving the scroll wheel upwards or a scroll-down input of continuously moving the scroll wheel downwards may correspond to a long press input on the channel-up or channel-down key, according to an exemplary embodiment.

In addition, a drag input which is provided via a touch pad may correspond to a long press input on the channel-up key or the channel-down key, according to an exemplary embodiment.

In operation S930, the image display device 100 may move the channel indicator in the first direction or the second direction along the channel scroll bar and display channel information that relates to a channel that corresponds to a point on the channel scroll bar at which the channel indicator is located, in response to the first input.

The image display device 100 may control the channel indicator so that the channel indicator moves from a first point on the channel scroll bar to a second point which is adjacent in the first direction to the first point, change channel information that relates to a first channel that corresponds to the first point to channel information that relates to a second channel next to the first channel, and display the channel information that relates to the second channel. Alternatively, the image display device 100 may move the channel indicator from the first point on the channel scroll bar to a third point which is adjacent in the second direction to the first point, change the channel information that relates to the first channel to channel information that relates to a third channel previous to the first channel, and display the channel information that relates to the third channel.

In addition, a time required to move the channel indicator from the first point to the second point or from the first point to the third point may vary inversely with respect to the number of channels stored in the memory 140.

In operation S940, the image display device 100 may receive a second input of releasing the channel-up key or the channel-down key.

Alternatively, when there is no scroll input for a predetermined time after a continuous scroll-up or scroll-down input, the image display device 100 may sense this case as the second input. Alternatively, the image display device 100 may sense, as the second input, an input of releasing a touch tool or the like from a touch pad after dragging on the touch pad.

In operation S950, the image display device 100 may switch a current channel to the channel that corresponds to the point on the channel scroll bar at which the channel indicator is located and display an image that corresponds to the switched channel, in response to the second input.

For example, the image display device 100 may determine the channel that corresponds to the point at which the channel indicator is located, based on a relative location of the channel indicator on the channel scroll bar. In addition, the image display device 100 may receive a broadcast signal that corresponds to the switched channel and display, on the display 130, an image generated based on the received broadcast signal.

According to an exemplary embodiment, an image display device may quickly switch a channel to a channel desired by a user without a numeric key.

The operating method of an image display device, according to an exemplary embodiment, may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the present inventive concept or may be known to and usable by one of ordinary skill in a field of computer software. Examples of the non-transitory computer-readable medium include magnetic media such as hard disks, floppy disks, or magnetic tapes, optical media such as compact disc-read only memories (CD-ROMs) or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter, as well as a machine language code made by a compiler.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image display device comprising:
a user interface;
a display;
a processor;
a receiver configured to receive a broadcast signal; and
a memory configured to store instructions that, when executed by the processor, cause the processor to:
store, in the memory, channel information corresponding to a plurality of channels;
receive, via the user interface, a channel change command comprising at least one of a channel-up command and a channel-down command;
identify whether the channel change command corresponds to a single channel change command causing a channel number to increment by one or a continuous channel change command causing the channel number to continuously increment on a channel-by-channel basis;
in response to identifying that the channel change command is the single channel change command, change a current channel to an adjacent channel, and control the display to display an image corresponding to the adjacent channel;
in response to identifying that the channel change command is the continuous channel change command, control the display to display a channel scroll bar and a channel indicator, the channel scroll bar comprising a plurality of channel points to which the channel indicator is movable, and the channel indicator indicating a position of a current channel among the plurality of channel points included in the channel scroll bar;
control the channel indicator to move in a first direction or a second direction along the channel scroll bar according to the channel change command which is received via the user interface after the channel scroll bar is displayed; and
control to switch the current channel to a channel that corresponds to a channel point on the channel scroll bar at which the channel indicator is located and display an image that corresponds to the switched channel,
wherein based on channel change command identified to be the single channel change command, the channel scroll bar is not displayed on the display, and
based on the channel change command identified to be the continuous channel change command, the channel scroll bar is displayed on the display.

2. The image display device of claim 1, wherein the continuous channel change command is identified by receiving a signal corresponding to pressing a channel change key continuously for a predetermined time period and the single channel change command is identified by receiving the signal corresponding to pressing the channel change key once for the predetermined time period.

3. The image display device of claim 1, wherein a time required to move the channel indicator from a start point from among the plurality of channel points to an end point from among the plurality of channel points is constant regardless of total number of channels stored in the memory.

4. The image display device of claim 1, wherein a time required to move the channel indicator from a first point on the channel scroll bar from among the plurality of channel points to a second point on the channel scroll bar which is adjacent to the first point varies inversely with respect to a total number of channels stored in the memory.

5. The image display device of claim 1, wherein the first direction is a direction that is oriented from a start point on the channel scroll bar from among the plurality of channel points to an end point on the channel scroll bar from among the plurality of points, and the second direction is a direction that is oriented from the end point to the start point.

6. The image display device of claim 1, wherein the memory is further configured to store instructions that, when executed by the processor, cause the processor to:
when the channel indicator moves from a first point to a second point on the channel scroll bar which is adjacent to the first point in the first direction, change channel information from channel information on a first channel that corresponds to the first point to channel information on a second channel next to the first channel and display the channel information on the second channel.

7. The image display device of claim 1, wherein the memory is further configured to store instructions that, when executed by the processor, cause the processor to:
when the channel indicator moves from a third point to a fourth point on the channel scroll bar which is adjacent to the third point in the second direction, change channel information on a third channel that corresponds to the third point to channel information on the fourth channel previous to the third channel and display the channel information on the fourth channel.

8. The image display device of claim 1, wherein the memory is further configured to store instructions that, when executed by the processor, cause the processor to:
display channel information which includes at least one from among a channel name of the channel that corresponds to the channel point at which the channel indicator is located, a broadcasting station name associated with the corresponding channel, a channel number associated with the corresponding channel, a type of content associated with the corresponding channel, and a content name of the content.

9. The image display device of claim 1, wherein the memory is further configured to store instructions that, when executed by the processor, cause the processor to:
compare total number of channels stored in the memory with a preset number in order to determine whether to display the channel scroll bar and the channel indicator.

10. The image display device of claim 1, wherein the memory is further configured to store instructions that, when executed by the processor, cause the processor to:
identify a channel that corresponds to a channel point on the channel scroll bar at which the channel indicator is located based on a relative location of the channel indicator on the channel scroll bar.

11. The image display device of claim 1, wherein the memory is further configured to store instructions that, when executed by the processor, cause the processor to:

group channels stored in the memory into a plurality of channel groups according to a predetermined criterion, wherein a first channel group from among the plurality of channel groups corresponds to a first region of the channel scroll bar, and a second channel group from among the plurality of channel groups corresponds to a second region of the channel scroll bar, and display channel information that relates to channels belonging to the first channel group when the channel indicator is located within the first region and displaying channel information of channels belonging to the second channel group when the channel indicator is located within the second region.

12. The image display device of claim 1, wherein the memory is further configured to store instructions that, when executed by the processor, cause the processor to:

control a first speed at which the channel indicator is movable in a first region that corresponds to preset channels and a second speed at which the channel indicator is movable in a second region, so that the first speed is different from the second speed.

13. The image display device of claim 1, wherein the continuous channel change command is identified by receiving a signal corresponding to pressing a channel change key continuously for a predetermined time period and the single channel change command is identified by receiving the signal corresponding to pressing the channel change key once for the predetermined time period.

14. An operating method which is executable by an image display device, the method comprising:

storing, in a memory of the image display device, channel information corresponding to a plurality of channels;

identifying whether a channel change command received via a user interface corresponds to a single channel change command causing a channel number to increment by one or a continuous channel change command causing the channel number to continuously increment on a channel-by-channel basis;

in response to identifying that the channel change command is the single channel change command, changing a current channel to an adjacent channel, and displaying an image corresponding to the adjacent channel;

in response to identifying that the channel change command is the continuous channel change command, displaying a channel scroll bar and a channel indicator, the channel scroll bar comprising a plurality of channel points to which the channel indicator is movable, and the channel indicator indicating a position of a current channel among the plurality of channel points included in the channel scroll bar;

moving the channel indicator in a first direction or a second direction along the channel scroll bar according to the channel change command which is received via the user interface after the channel scroll bar is displayed; and switching the current channel to a channel that corresponds to a channel point on the channel scroll bar at which the channel indicator is located and displaying an image that corresponds to the switched channel, wherein based on channel change command identified to be the single channel change command, the channel scroll bar is not displayed on the display, and based on the channel change command identified to be the continuous channel change command, the channel scroll bar is displayed on the display.

15. The method of claim 14, wherein the continuous channel change command is identified by receiving a signal corresponding to pressing a channel change key continuously for a predetermined time period and the single channel change command is identified by receiving the signal corresponding to pressing the channel change key once for the predetermined time period.

16. The method of claim 14, wherein a time required to move the channel indicator from a start point on the channel scroll bar from among the plurality of channel points to an end point on the channel scroll bar from among the plurality of channel points is constant regardless of total number of channels stored in the memory.

17. The method of claim 14, further comprising:

when the channel indicator moves from a first point to a second point on the channel scroll bar which is adjacent to the first point in the first direction, changing channel information from channel information on a first channel that corresponds to the first point to channel information on a second channel next to the first channel and displaying the channel information on the second channel.

18. The method of claim 14, further comprising:

when the channel indicator moves from a third point to a fourth point on the channel scroll bar which is adjacent to the third point in the second direction, changing channel information on a third channel that corresponds to the third point to channel information on the fourth channel previous to the third channel and displaying the channel information on the fourth channel.

19. The method of claim 14, further comprising identifying a channel that corresponds to a channel point on the channel scroll bar at which the channel indicator is located based on a relative location of the channel indicator on the channel scroll bar.

20. A non-transitory computer-readable recording medium having recorded thereon a computer-readable program for executing the method of claim 14.

* * * * *